United States Patent [19]
Naito et al.

[11] Patent Number: 5,623,316
[45] Date of Patent: Apr. 22, 1997

[54] ON-SCREEN DISPLAY APPARATUS AND ON-SCREEN DISPLAY METHOD

[75] Inventors: Masahiro Naito; Yoshiteru Suzuki; Kouji Minami, all of Nagaokakyo, Japan

[73] Assignee: Mitsubishi Denki Kabushiki Kaisha, Tokyo, Japan

[21] Appl. No.: 535,766

[22] Filed: Sep. 28, 1995

[30] Foreign Application Priority Data

| Oct. 5, 1994 | [JP] | Japan | 6-241290 |
| Oct. 7, 1994 | [JP] | Japan | 6-244065 |
| Apr. 28, 1995 | [JP] | Japan | 7-105319 |

[51] Int. Cl.⁶ .................................................. H04N 5/50
[52] U.S. Cl. ........................... 348/569; 348/589; 348/511
[58] Field of Search .................................. 348/563, 564, 348/570, 569, 589, 600, 516, 511, 584, 586; H04N 5/04, 9/44, 9/475, 5/445, 5/50, 9/74

[56] References Cited

U.S. PATENT DOCUMENTS 5,396,297  3/1995  Shindou ................................ 348/569

FOREIGN PATENT DOCUMENTS 321174  1/1991  Japan.

OTHER PUBLICATIONS

"Information/Acoustic/Visual IC", Fujitsu Semiconductor Device Data Book, (DB52–00931–1), pp. 929–939 (1993).
"Information/Acoustic/Visual IC", Fujitsu Semiconductor Device Data Book, (DB52–00931–1), pp. 951–984 (1993).

Primary Examiner—Sherrie Hsia

[57] ABSTRACT

In an on screen display apparatus and an on-screen display method, the number of scanning lines of an input signal is detected. In accordance with the result of the detection, a vertical dot number of a character to be displayed is determined and font data is read from a memory device after adjusting a dot number of a blank portion of the font data. Hence, even if the number of the scanning lines changes, the number and positions of characters displayed in one screen remain constant.

9 Claims, 28 Drawing Sheets

FACE DATA DD   FONT DATA DC

ON-SCREEN DISPLAY APPARATUS AND ON-SCREEN DISPLAY METHOD

BACKGROUND OF THE INVENTION

1. Field of the Invention

The present invention relates to an on-screen display apparatus and on-screen display method for displaying a character (including a symbol and a pattern) or a test pattern instead of or over an input image signal so as to adjust a picture quality or a screen of a television, a display or the like.

2. Description of Related Art

FIG. 1 is a block diagram showing a principal portion of a conventional on-screen display apparatus which is shown, for example, in a block diagram on p. 931, "Information/Acoustic/Visual IC" (DB52-00931-1), Fujitsu Semiconductor Device Data Book, 1993.

In FIG. 1, denoted at 1 is a dot clock generating part. In response to a horizontal synchronizing signal HSYNC, the dot clock generating part 1 generates a dot clock signal CLKD for each dot in a horizontal direction of a character and outputs the dot clock signal CLKD to a horizontal position control part 3 and a vertical/horizontal character size control part 4. A vertical position control part 2 receives a vertical synchronizing signal VSYNC and outputs an output signal RV to the vertical/horizontal character size control part 4, to thereby control a vertical display position of a character on an on-screen display screen. In accordance with the signal CLKD from the dot clock generating part 1 and the horizontal synchronizing signal HSYNC, the horizontal position control part 3 controls a horizontal display position of a character on an on-screen display screen. Receiving the output RV from the vertical position control part 2 and an output signal RH from the horizontal position control part 3, the vertical/horizontal character size control part 4 controls the signals CLKD and RH by frequency-division so as to adjust a horizontal dot number and a vertical dot number (i.e., character size) of a character which is formed on the display screen. The vertical/horizontal character size control part 4 then outputs signals RV1 and RH1 to a timing generating part 5.

In response to the signals RV1 and RH1, the timing generating part 5 generates various types of timing signals which are to be supplied to the on-screen display apparatus and outputs the timing signals to a read address counter 6, a display memory RAM 7, a character generator ROM 8 and a shift register 9. The read address counter 6 generates a memory read address signal which is needed for on-screen display of a character on the screen. The display memory RAM 7 stores face data which is formed by codes of a character which is to be displayed on-screen. The character generator ROM 8 stores font data which corresponds to the face data which is stored in the display memory RAM 7. An output font signal DC which corresponds to output face data DD outputted from the display memory RAM 7 is outputted from the character generator ROM 8 to the shift register 9. The shift register 9 performs parallel/serial conversion on the output font signal DC outputted from the character generator ROM 8 and outputs the signal bit by bit. A display control part 10 performs display attribute control on an output signal SC outputted from the shift register 9 to turn on and off Reverse (I), Red (R), Green (G) and Blue (B), etc.

FIG. 2 is a block diagram showing a structure of the vertical/horizontal character size control part 4 and the read address counter 6. The vertical/horizontal character size control part 4 comprises a horizontal character size control part 11 and a vertical character size control part 12. The horizontal character size control part 11 divides the frequency of the dot clock CLKD from the dot clock generating part 1 by an integer to control the character size in the horizontal direction. The vertical character size control part 12 divides the frequency of the signal RH from the horizontal position control part 3 by an integer to control the character size in the vertical direction.

The read address counter 6 comprises a horizontal character dot counter 13, a horizontal character address counter 14, a vertical character dot counter 15 and a vertical character address counter 16. Through the timing generating part 5, the horizontal character dot counter 13 receives a signal which is obtained b: dividing the frequency of the dot clock CLKD by an integer by the character size control part 11, and generates a pulse for each character while counting the number of dots of the character in the horizontal direction. Pulses from the horizontal character dot counter 13 are supplied to the horizontal character address counter 14. The horizontal character address counter 14 counts the pulses and generates an on-screen horizontal direction address of the character. Through the timing generating part 5, the vertical character dot counter 15 receives a signal which is generated by the vertical character size control part 12. The vertical character dot counter 15 counts the number of dots of the character in the vertical direction and outputs a signal to the vertical character address counter 16. The vertical character address counter 16 counts the signal from the vertical character dot counter 15 and generates a vertical direction address of the character.

In such a conventional on-screen display apparatus, the horizontal synchronizing signal HSYNC is supplied to the dot clock generating part 1, so that the dot clock generating part 1 generates a dot clock for forming dots of a character in the horizontal direction, i.e., the dot clock CLKD) which is equal to the frequency of the horizontal synchronizing signal HSYNC as it is multiplied by an integer and which synchronizes with the horizontal synchronizing signal HSYNC. The horizontal synchronizing signal HSYNC is also supplied to the horizontal position control part 3, so that the dot clock CLKD generated by the dot clock generating part 1 is counted for an optional number of times and the horizontal reset signal RH which has been adjusted for a horizontal phase is obtained. The horizontal reset signal RH is used to control the starting position of displaying the character on the display screen in the horizontal direction. On the other hand, the vertical synchronizing signal VSYNC is supplied to the vertical position control part 2, so that the signal RH from the horizontal position control part 3 is counted for an optional number of times and the vertical reset signal RV which has been adjusted for a vertical phase is obtained. The vertical reset signal RV is used to control the starting position of displaying the character on the display screen in the vertical direction.

The horizontal character size control part 11 divides the frequency of the dot clock CLKD by an integer to multiply the dot number of the character in the horizontal direction by an integer. In a similar manner, the vertical character size control part 12 divides the frequency of the signal RH from the horizontal position control part 3 by an integer to multiply the dot number of the character in the vertical direction by an integer. Controlling in this manner, a character is displayed on the screen as having a length doubled in the horizontal direction when only the horizontal character size control part 11 is set to divide a frequency into half, but as having a length doubled in the vertical direction when only the vertical character size control part 12 is set to divide a frequency into half, as shown in FIG. 3, for instance. When both the horizontal character size control part 11 and the vertical character size control part 12 are set to divide a frequency into half, the character is displayed on the screen as doubled in both the horizontal and the vertical direction.

Receiving the output signals RV1 and RH1 from the vertical/horizontal character size control part 4, the timing generating part 5 generates various types of timing pulses which are needed for subsequent on-screen displaying and control operations.

In the read address counter 6, as described above, a clock obtained by frequency-division performed by the horizontal character size control part 11 is supplied to the horizontal character dot counter 13 through the timing generating part 5, so that the horizontal character dot counter 13 counts a horizontal direction dot number NH of the character. An output from the horizontal character dot counter 13 is supplied to the horizontal character address counter 14, and the horizontal character address counter 14 counts a horizontal direction character number MH on the screen and generates a horizontal direction display address of the character on the display screen. A signal from the vertical character size control part 12 is supplied to the vertical character dot counter 15 through the timing generating part 5 and the vertical character dot counter 15 counts a vertical direction dot number (hereinafter "vertical dot number") NV of the character. An output from the vertical character dot counter 15 is supplied to the vertical character address counter 16. The vertical character address counter 16 counts a vertical direction character number (hereinafter "vertical character number") MV on the screen and generates a vertical direction display address of the character on the display screen. In such a structure, as shown in FIG. 4, a character area is formed which measures MH characters in the horizontal direction with NH dots for each character and MV characters in the vertical direction with NV dots for each character.

In response to a display memory write address signal supplied from a microcomputer bus or the like, the display memory RAM 7 writes face data of on-screen display on a display memory map which corresponds to the screen. Further, in response to a memory read address signal RA generated by the read address counter 6, the face data DD which has been written in the display memory RAM 7 is read.

Data structure in the display memory RAM 7 can be expressed as shown in FIG. 5, for example. In FIG. 5, a character cede of Nd bits is written in a memory map area which corresponds to a display area on the screen and which measures MH characters in the horizontal direction and MV characters in the vertical direction. In response to the memory read address signal RA, the character cede of Nd bits is read in parallel to the face data DD.

While ASCII codes are generally well known as character codes, the character codes in the present invention are those which are described in "Information/Acoustic/Visual IC" (DB52-00931-1), p. 961, Fujitsu Semiconductor Device Data Book, 1993. In accordance with such face data DD, the font data DC written in the character generator ROM 8 is read.

The font data DC of Nd bits outputted in parallel in the horizontal direction from the character generator ROM 8 is parallel/serial converted by the shift register 9, whereby the time series font signal SC is obtained. This font signal SC is supplied to the display control part 10 and outputted as on-screen display signals RO, GO and BO which are controlled for attributes independently of R, G and B.

The display control part 10 has a circuit structure as that shown in FIG. 6, for instance. Denoted at 17 is an exclusive OR gate for reversing the font signal SC which is supplied thereto. The font signal controlled for reversing by the exclusive OR gate 17 is supplied to AND gates 18, 19 and 20. In such a display control part 10, the font signal SC is processed by non-reverse/reverse control based on the input control signal SI supplied to one terminal of the exclusive OR gate 17, and outputted independently of R, G and B as the on-screen outputs RO, GO and BO which are ON/OFF controlled by input control signals SR, SG and SB supplied to one terminals of the AND gates 18, 19 and 20.

In such a conventional on-screen display apparatus, attributes of a character to be displayed on the screen are changed in accordance with the signals SI, SR, SG and SB. However, in most cases, the signals SI, SR, SG and SB are controlled by a control signal which is stored in a memory or the like which is disposed outside the on-screen display apparatus. Where a control operation is provided in such a manner, it is difficult to set different attributes for each character which is to be displayed on the screen. For example, it is likely that attributes are controlled per screen only.

An on-screen display apparatus in which it is possible to switch attributes of any wanted character in one screen picture is desired in order to more efficiently perform on-screen display of a number of menu screens or the like which are displayed for adjustment of a picture quality and a screen of a television and a display which have advanced functions and adjustable items.

FIG. 7 is a block diagram showing other structure of a conventional on-screen display apparatus. This is an on-screen display apparatus which can control displaying character by character. In FIG. 7, denoted at 21 is an attribute control memory RAM which writes and reads in accordance with address signals and control signals which are similar to those used for the display memory RAM 7. The on-screen display apparatus is otherwise similar to the conventional apparatus described with reference to FIG. 1, and therefore, a redundant description will be omitted.

In such a on-screen display apparatus, the attribute control memory RAM 21 is expressed as shown in FIG. 8 just like the structure of the display memory RAM 7 is expressed as shown in FIG. 5. Hence, during reading of character code data for on-screen displaying from the display memory RAM 7, a display control signal which is related to the character (hereinafter "attribute data signal") is also read. By connecting the attribute data signal to the non-reverse/ reverse control signal SI and control signals SR, SG and SB for controlling ON/OFF of R, G and B which are supplied to the display control part 10, the on-screen display apparatus changes attributes of each character.

Further, some other conventional on-screen display apparatuses not only display attributes of characters as above but also perform a function of a test pattern generating circuit which displays a test pattern signal having a gradation such as a stepped wave and a window signal.

FIG. 9 is a block diagram showing other structure of a conventional on-screen display apparatus which additionally has a function of a test pattern generating circuit. In FIG. 9, denoted at 22 is a test pattern generating part which receives a timing signal which is generated by the timing generating part 5 and which is synchronized with a displayed screen, to thereby generate a test signal having a gradation such as a stepped wave and a window signal. A digital signal outputted from the test pattern generating part 22 is supplied to a digital/analog convertor 23. Outputs RT, GT and BT from the digital/analog convertor 23 are supplied to an R-adder 24, a G-adder 25 and a B-adder 26. The on-screen signals RO, GO and BO regarding R, G and B from the display control part 10 are supplied to the R-adder 24, the G-adder 25 and the B-adder 26, respectively to be added. The on-screen display apparatus is otherwise similar to the conventional apparatus described with reference to FIG. 1, and therefore, a redundant description will be omitted.

In such an on-screen display apparatus, the test pattern generating part 22 for generating a test pattern signal which is needed to adjust a screen is disposed independently, for example. Hence, a digital test signal from the test pattern generating part 22 is digital/analog converted into an analog signal by the digital/analog convertor 23, and the R-adder 24, the G-adder 25 and the B-adder 26 add the converted signals RT, GT and BT to the font signals RO, GO and BO which have controlled display. As a result, the output signals RS, GS and BS are obtained.

Accurate signal generation is possible if the test pattern generating part 22 is formed by "a gradation memory RAM" which is similar to the attribute control memory RAM 21 which was described with reference to FIG. 8 showing the conventional technique as the means for generating a signal having a gradation at an optional position in the screen. Test pattern signals generated by the gradation memory RAM include a color bar, a stepped wave and a window signal. Not only generating a test pattern signal, the gradation memory RAM my have various features to generate a color gradation signal which can be displayed with the test pattern signal on the screen.

The conventional on-screen display apparatus as above has the following problems.

Now, it is assumed that the conventional on-screen display apparatus displays a picture as that shown in FIG. 10 in response to an NTSC (national television system committee) signal, for example. When an input signal is switched with an extended definition television (EDTV) signal for performing twice as much as scanning realized by the NTSC signal (i.e., an EDTV signal to which twice as many as scanning lines of the NTSC signal are assigned) in a state where the frequency-division ratio of the vertical/horizontal character size control part 4 is fixed, as shown in FIG. 11, the number of the scanning liens is doubled in a display area per character. Hence, the position of a character changes and the size of the character is reduced to half as compared with the case shown in FIG. 10.

To deal with this, the vertical character size control part 12 divides into half the frequency of a signal supplied from the horizontal position control part 3, doubling the vertical dot number of the character. As a result, the character is displayed on the screen at the same vertical position and with the same character size as in the case here an NTSC signal is supplied.

Thus, when the number of the scanning lines of an inputted synchronizing signal changes simply by a factor of an integer as the relationship between an NTSC signal and an EDTV signal, it is possible to maintain the position and the size of a character constant on the screen under the control of the vertical character size control part 12. However, if the number of the scanning lines of an inputted signal is not an integer-multiplication of that of a reference signal, no matter how the frequency-division is switched by the vertical character size control part 12, it is impossible to maintain the position and the size of a character constant on the screen and to maintain the number of characters displayed on the screen constant. Further, neither the vertical size of each character is constant. Due to this, when a menu screen for adjustment of a screen, for instance, is to be displayed, the position of the menu screen changes, some characters become missing on the screen or other problems occur.

To control attributes of each character, the conventional on-screen display apparatus of FIG. 7 additionally needs the attribute control memory RAM 21 which corresponds to control bits for the display control part. Although the attribute control memory RAM 21 uses four bits to deal with the attributes SI, SR, SG and SB in this conventional technique, it is necessary to additionally expand bits if a further attribute is needed, which increases a cost.

The gradation memory RAM which serves as the test pattern generating part 22 needs additional 6 to 8 bits, for example, to obtain a gradation characteristic which is needed for a test signal. This also increases a cost.

SUMMARY OF THE INVENTION

The present invention has been made to solve such problems as described above. An object of the present invention is therefore to obtain an on-screen display apparatus and an on-screen display method which can maintain an on-screen display position of a character almost unchanged and the number of characters to be displayed on a screen constant even if the number of scanning lines of an input signal changes.

An on-screen display apparatus according to the present invention includes a memory means for storing a plurality of font data including face data and a blank portion; a counter for counting synchronizing signals in a number of dots corresponding to that of scanning lines; a detection means for detecting the number of the scanning lines in one picture screen from a signal input therein; and a vertical dot count control means for determining a vertical dot number of a character to be displayed in accordance with the number of the scanning lines detected by said detection means and for outputting to said counter a signal which controls the number to be counted by said counter, wherein the font data with the vertical dot number of the blank portion adjusted in accordance with the number to be counted by said counter are outputted from said memory means.

An on-screen display method according to the present invention includes the steps of: detecting the number of scanning lines of an input signal; determining a vertical dot number of a character to be displayed in accordance with the detected number of the scanning lines; counting synchronizing signals in a number of dots corresponding to that of scanning lines by a counter in accordance with the determined vertical dot number; and outputting font data selected from a memory means which stores a plurality of font data including face data and a blank portion after adjusting a vertical dot number of said blank portion in accordance with a number to be counted by said counter.

Thus, since the vertical dot number of a character read from said memory means is controlled in accordance with the detected number of the scanning lines, the number and the positions of displayed characters remain unchanged.

Further, the on-screen display apparatus or the on-screen display method according to the present invention further includes a vertical character size control means for instructing said counter to count up in every predetermined number in accordance with the detected number of the scanning lines so as to control a vertical size of the face data.

Hence, the vertical dot number of a character to be displayed is determined in accordance with the detected number of the scanning lines. Since the number of signals for which one is to be counted, i.e., plural reading is controlled, even when the vertical dot number yielded based on the number of the scanning lines exceeds a maximum vertical dot number which forms the font data, a display position of a character on the screen is maintained constant.

A further object of the present invention is to obtain an on-screen display apparatus and an on-screen display method which can maintain on-screen display positions and the number of characters displayed on a screen constant and sizes of characters displayed on the screen almost constant even if the number of scanning lines of an input signal changes.

The on-screen display apparatus according to the present invention including said memory means, said counter, said detection means and said vertical dot count control means, further including a font data selection means for selecting font data from said memory means in accordance with the number of the scanning lines detected by said detection means, wherein said memory means stores font data about various kinds of characters each of which differs in the number of vertical dots from each other, the vertical dots form said face data.

The on-screen display method according to the present invention, wherein said memory means stores font data about various kinds of characters each of which differs in the number of vertical dots from each other, and that font data is outputted from said memory means based on the number of the scanning lines detected by said detection means.

Hence, the vertical dot number of a character to be displayed is determined in accordance with the detected number of the scanning lines. In addition, since font data of a desired character size is read from said memory means which stores font data about various kinds of character sizes regarding the same character, the number and the sizes of displayed characters are maintained unchanged.

Further, in addition to said memory means, said counter, said detection means and said vertical dot count control means, the on-screen display apparatus according to the present invention includes a font data selection means for selecting font data from said memory means in accordance with the number of scanning lines detected by said detection means, wherein said vertical dot count control means instructing said counter to count up in every predetermined number in accordance with the detected number of the scanning lines so as to control a vertical size of the face data, and said memory means stores font data about various kinds of characters each of which differs in the number of vertical dots from each other, the vertical dots form said face data.

The on-screen display method according to the present invention further includes the step of instructing said counter to count up in every predetermined number in accordance with the detected number of the scanning lines so as to control a vertical size of the face data, said memory means stores font data about various kinds of characters each of which differs in the number of vertical dots from each other, the vertical dots form said face data, and font data corresponding to the detected number of the scanning lines is outputted from said memory means.

Hence, the vertical dot number of a character to be displayed is determined in accordance with the detected number of the scanning lines. In addition, since the number of signals for which one is to be counted, i.e., plural reading is controlled, even when the vertical dot number yielded based on the number of the scanning lines exceeds a maximum vertical dot number which forms the font data, a display position of a character on the screen is maintained constant. Further, since font data of a desired character size is read from said memory means which stores font data about various kinds of character sizes regarding the same character, the number and the sizes of displayed characters are maintained unchanged. Still further, vertical character size means is not necessary, and therefore, the size of the apparatus is reduced.

In addition to said memory means, said counter, said detection means, said vertical dot count control means and said vertical character size control means, the on-screen display apparatus according to the present invention comprises a font data selection means for selecting font data from said memory means in accordance with the number of the scanning lines detected by said detection means, and said memory means stores font data about various kinds of characters each of which differs in the number of vertical dots from each other, the vertical dots form said face data.

Hence, the vertical dot number of a character to be displayed is determined in accordance with the detected number of the scanning lines. In addition, since the number of signals for which one is to be counted, i.e., plural reading is controlled, even when the vertical dot number yielded based on the number of the scanning lines exceeds a maximum vertical dot number which forms the font data, a display position of a character on the screen is maintained constant. Further, since font data of a desired character size is read from said memory means which stores font data about various kinds of character sizes regarding the same character, the number and the sizes of displayed characters are maintained unchanged.

A still other object of the present invention is to obtain a simple and inexpensive on-screen display apparatus and method which can realize display attribute control on each character by means of a minimum expansion of a memory by only 1 bit.

The on-screen display apparatus according to the present invention includes: a display memory storing face data and attribute data which determines attributes of characters to be displayed, said face data and said attribute data each including binary data to identify each data; a memory means storing font data which correspond to said face data; a switching means for receiving said face data from said display memory and outputting either said face data or previously supplied fixed data to said memory means in accordance with said binary data; a hold means for receiving said attribute data from said display memory and holding said attribute data in accordance with said binary data; and a display control means for receiving said font data from said memory means and controlling display of a character based on the attribute data held by said hold means, wherein said hold means updates the attribute data to hold when said fixed data is outputted to said memory means.

Since signals are switched by the binary data which are added to the face data for selecting font data and the attribute data for controlling display of characters, a proper one of the face data and the attribute data can be used during reproduction, thereby making it possible to control display attributes for each character.

Other object of the present invention is to obtain a simple and inexpensive on-screen display apparatus and method which can generate a test pattern for each character by means of a minimum expansion of a memory by only 1 bit.

The on-screen display apparatus according to the present invention includes: a display memory storing face data and test pattern data, said face data and said test pattern data each including binary data to identify each data; a memory means storing font data which correspond to said face data; a first switching means for receiving said face data from said display memory and outputting either said face data or previously supplied first fixed data to said memory means in accordance with said binary data; a display control means for receiving said font data from said memory means and outputting a signal for display control of a character; a second switching means for receiving said test pattern data from said display memory and outputting either said test pattern data or previously set second fixed data in accordance with said binary data; and an addition means for adding an output from said display control means and an output from said second switching means.

Since signals are switched by the binary data which are added to the face data for selecting font data and the test pattern data, a proper one of the face data and the test pattern data can be used during reproduction, thereby making it possible to display the test pattern for each character.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

In the following, the present invention will be described with reference to associated drawings.

First Preferred Embodiment

Figure 12:
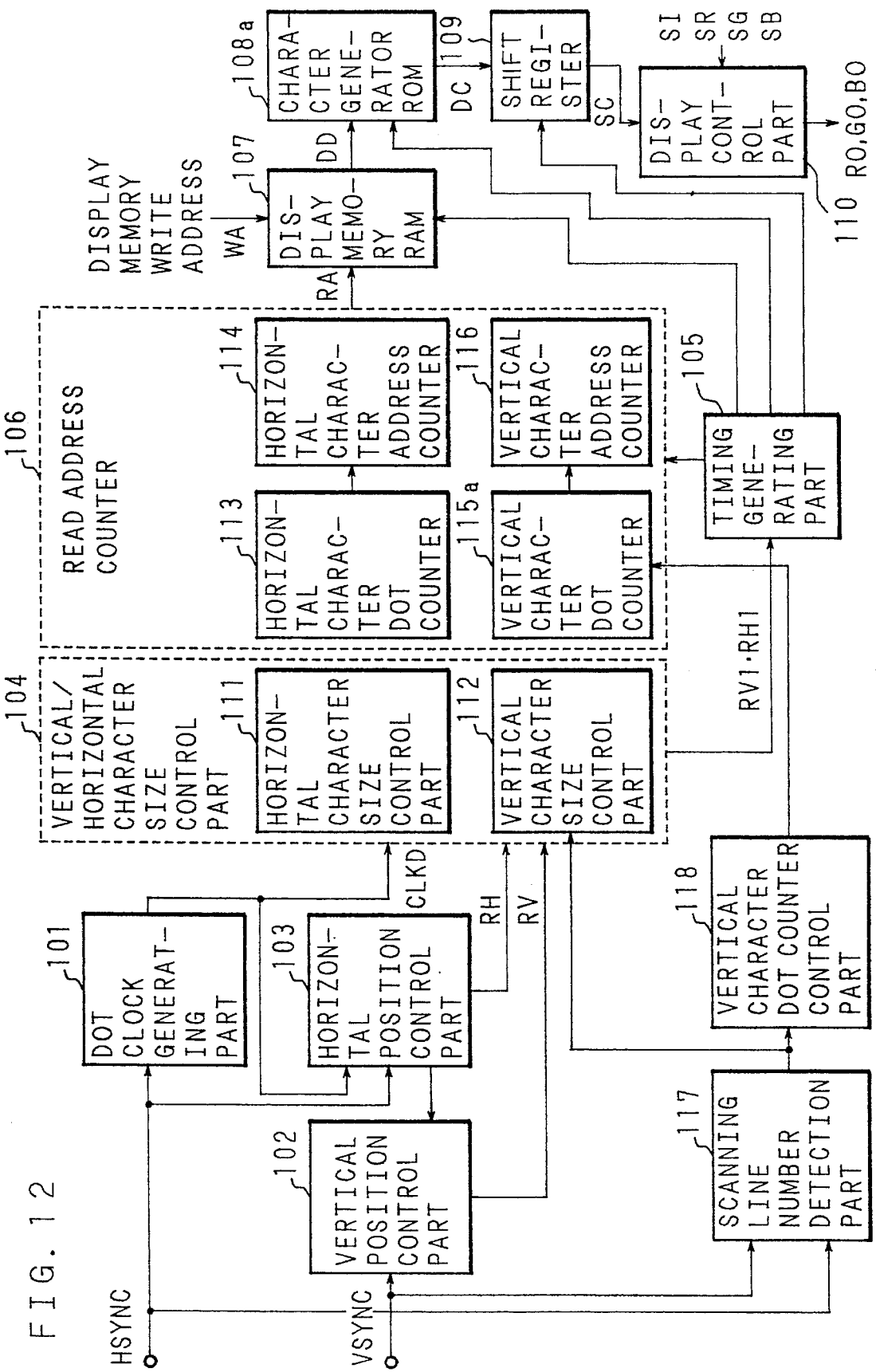
FIG. 12 is a block diagram showing a principal structure of an on-screen display apparatus according to a first preferred embodiment of the present invention.

FIG. 12 is a block diagram of an on-screen display apparatus according to a first preferred embodiment of the present invention. In FIG. 12, denoted at 101 is a dot clock generation part. Receiving a horizontal synchronizing signal HSYNC, the dot clock generation part 101 generates a dot clock signal CLKD for each dot in a horizontal direction of a character and outputs the dot clock signal CLKD to a horizontal position control part 103 and a vertical/horizontal character size control part 104. A vertical position control part 102 receives a vertical synchronizing signal VSYNC and outputs an output signal RV to the vertical/horizontal character size control part 104, to thereby control a vertical display position of a character on an on-screen display screen. To control a horizontal display position of the character on the on-screen display screen by means of the signal CLKD from the dot clock generation part 101 and the horizontal synchronizing signal HSYNC, the horizontal position control part 103 outputs an output signal RH to the vertical/horizontal character size control part 104. Receiving the output signal RV from the vertical position control part 102 and the output signal RH from the horizontal position control part 103, the vertical/horizontal character size control part 104 divides the frequency of the signals CLKD and RH and outputs signals RV1 and RH1 to a timing generating part 105 in order to adjust a horizontal dot number and a vertical dot number (i.e., character size) of a character which is to be formed on the display screen.

The vertical/horizontal character size control part 104 comprises a horizontal character size control part 111 and a vertical character size control part 112. The horizontal character size control part 111 divides the frequency of the clock signal CLKD supplied from the dot clock generation part 101 by an integer. The vertical character size control part 112 divides the frequency of the signal RH supplied from the horizontal position control part 103 by an integer.

A read address counter 106 comprises a horizontal character dot counter 113, a horizontal character address counter 114, a vertical character dot counter 115a and a vertical character address counter 116. Through the timing generating part 105 which will be described later, the horizontal character dot counter 113 receives a signal which is obtained by dividing the frequency of the dot clock signal CLKD by an integer by the character size control part 111, and generates a pulse for each character by counting the number of dots of the character in the horizontal direction. Pulses from the horizontal character dot counter 113 are supplied to the horizontal character address counter 114. The horizontal character address counter 114 counts the pulses and generates a horizontal direction address of the character on the display screen. Through the timing generating part 105, the vertical character dot counter 115a receives a signal which is generated by the vertical character size control part 112. The vertical character dot counter 115a counts the number of dots of the character in the vertical direction and outputs a signal to the vertical character address counter 116. The vertical character address counter 116 counts the signal from the vertical character dot counter 115a and generates a vertical direction address of the character.

A scanning line number detection part 117, a unique element used in the present invention, receives the horizontal synchronizing signal HSYNC and the vertical synchronizing signal VSYNC, detects the number of scanning lines scanned by the input signal and outputs a signal which expresses a result of detection to the vertical character size control part 112 and a vertical character dot counter control part 118. The vertical character dot counter control part 118 outputs a vertical character dot counter control signal for counting to the vertical character dot counter 115a in accordance with a detected number of the scanning lines. The vertical character dot counter control signal controls a count set value NV of the vertical character dot counter 115a.

Receiving the signals RV1 and RH1 from the vertical/horizontal character size control part 104, the timing generating part 105 generates various types of timing signals which are to be supplied to the on-screen display apparatus and outputs the timing signals to the read address counter 106, a display memory RAM 107, a character generator ROM 108a and a shift register 109. The read address counter 106 generates a memory read address signal which is needed for on-screen display of a character on the screen. The display memory RAM 107 stores face data which is formed by codes of a character which is to be displayed on-screen. The character generator ROM 108a stores font data which corresponds to the face data which is stored in the display memory RAM 107. The font data is formed by adding a vertical character dot number adjusting blank portion under the face data.

The character generator ROM 108a outputs an output font signal DC which corresponds to the output face data DD outputted from the display memory RAM 107 to the shift register 109. The shift register 109 performs parallel/serial conversion on the output font signal DC outputted from the character generator ROM 108a and outputs the signal bit by bit. A display control part 110 performs display attribute control on an output signal SC outputted from the shift register 109, to thereby turn on and off Invert (I), Red (R), Green (G) and Blue (B), etc.

To control the vertical dot number of font data which is selected by the character generator ROM 108a, the number of dots to be read from the blank portion of the font data is changed in accordance with the set value NV which is counted by the vertical character dot counter 115a. This controls the vertical dot number of each character, which in turn keeps the number of characters on the screen constant regardless of the number of scanning lines. When the set value NV exceeds a maximum vertical dot number NV (MAX) forming the font data, the vertical character size control part 112 instructs the vertical character dot counter 115a to perform plural reading (i.e., to count up for every predetermined number of dots) in response to a detection signal from the scanning line number detection part 117. As a result, a character is displayed without extending beyond a display range of the vertical direction.

When MV characters are on the screen in the vertical direction and the input signal scans SV scanning lines, for example, the vertical dot number NVc for each character is expressed as:

$$NVc = INT(SV/MV) \qquad (1)$$

The function INT(X) is a function to obtain an integer part of X. In this case, if NVc≦NV(MAX) assuming that the maximum vertical dot number of the font data stored in the character generator ROM 108a is NV(MAX), in accordance with an instruction from the vertical character size control part 112, the vertical character dot counter 115a is set to perform single reading (i.e., to count up for each dot) and the count set value NV of the vertical character dot counter 115a is set as:

$$NV = NVc \qquad (2)$$

When NV(MAX)<NVc≦2NV(MAX), the vertical character dot counter 115a is set to perform double reading (i.e., to frequency-divide by 2 and to count up for each two dots) in accordance with an instruction from the vertical character size control part 112, and the set value NV of the vertical character dot counter 115a is set as:

$$NV = INT(SV/2MV) \qquad (3)$$

Similarly, when 2NV(MAX)<NVc and the following relationship is satisfied, $$(n-1) \times NV(MAX) < NVc \leq n \times NV(MAX) \qquad (4)$$

(where n is an integer larger than 3) the vertical character dot counter 115a is set to perform n times of reading (i.e., to divide the frequency of by n and to count up each n dots) in accordance with an instruction from the vertical character size control part 112, and the set value NV of the vertical character dot counter 115a is set as:

$$NV = INT(SV/(n \times MV)) \qquad (5)$$

Thus, the vertical character dot counter 115a controls the vertical dot number of a character in accordance with an instruction from the vertical character dot counter control part 118 and plural reading of dots is set in accordance with an instruction from the vertical character size control part 112. Hence, it is possible to maintain the number of characters displayed on the screen in the vertical direction constant and to keep character display positions almost unchanged even if the number of the scanning lines to be scanned by the input signal changes.

TABLE 1 shows an example of the set value NV of the dot counter which corresponds to the number of the scanning lines SV to be scanned the input signal and examples of n times of reading.

Referring to TABLE 1, a specific description will be given on a case where the input signal scans 252 scanning lines, for example. Assuming that the number of characters displayed in one screen picture in the vertical direction is 14, when the number of the scanning lines is 252, the vertical dot number NVc for each character in one screen picture is calculated from the equation (1) above as:

$$NVc = INT(252/14) = 18 \qquad (6)$$

Figure 14:
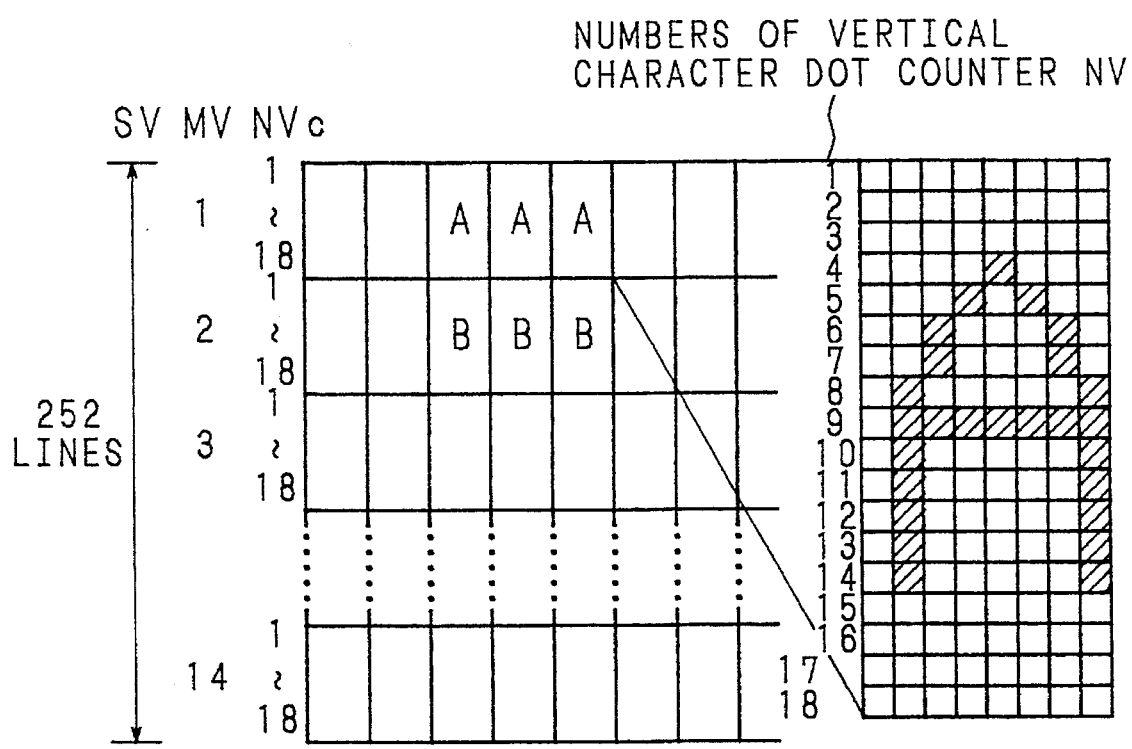
FIG. 14 is a view showing an example of a character display screen when an input signal scans 252 scanning lines in the first preferred embodiment.

If NV≦NV(MAX) here, the count set value NV of the vertical character dot counter 115a is set 18 and single reading is set. FIG. 14 shows a character as it is displayed on the screen with this setting.

Now, in a case where the input signal scans 784 scanning lines, the vertical dot number NVc for each character in one screen picture is calculated similarly from the equation (1) as:

$$NVc = INT(784/14) = 56 \qquad (7)$$

If NV(MAX)<NVc≦2NV(MAX) here, the vertical character dot counter 115a is instructed to perform double reading. The set value NV of the vertical character dot counter 115a is found as:

$$NV = INT(784/(2 \times 14)) = 28 \qquad (8)$$

Figure 15:
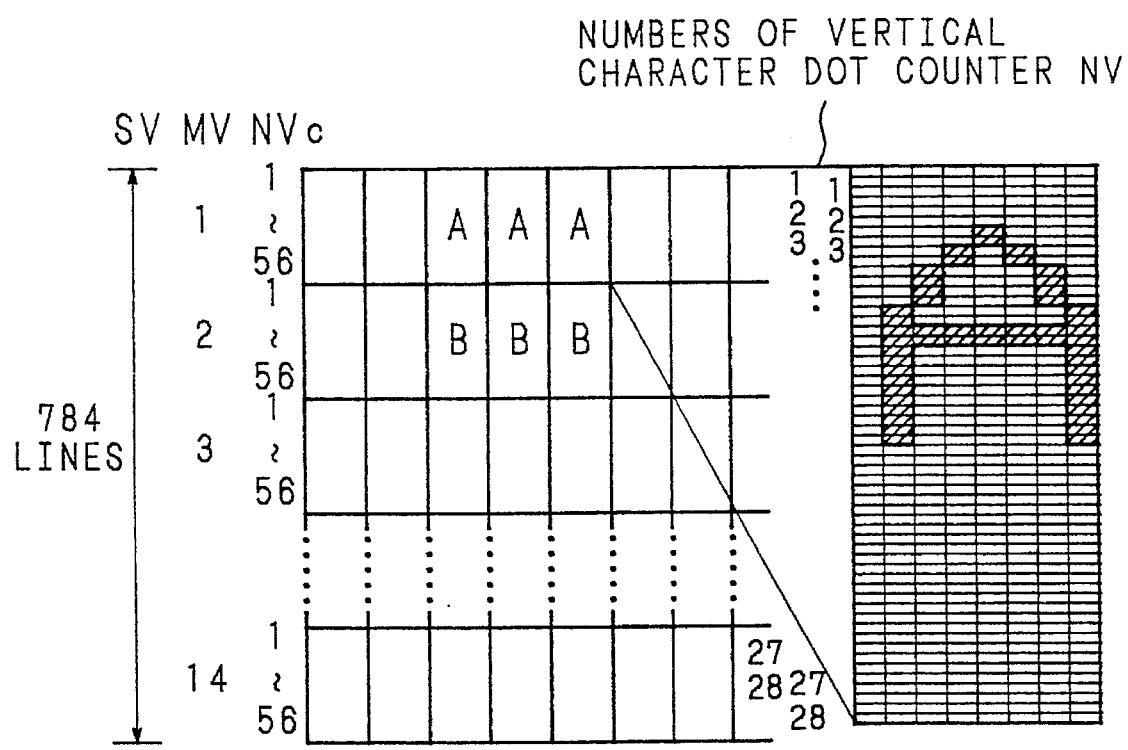
FIG. 15 is a view showing an example of a character display screen when an input signal scans 784 scanning lines in the first preferred embodiment.

Hence, when the vertical character dot counter 115a is set to read a character twice and the count value NVc of the vertical character dot counter 115a is set 28, a character is displayed on the screen as shown in FIG. 15. Thus, according to this embodiment, as can be understood by comparing FIG. 14 with FIG. 15, it is possible to maintain the number of characters displayed on the screen in the vertical direction constant and to keep character display positions almost unchanged even if the number of the scanning lines to be scanned by the input signal changes.

Second Preferred Embodiment

Figure 16:
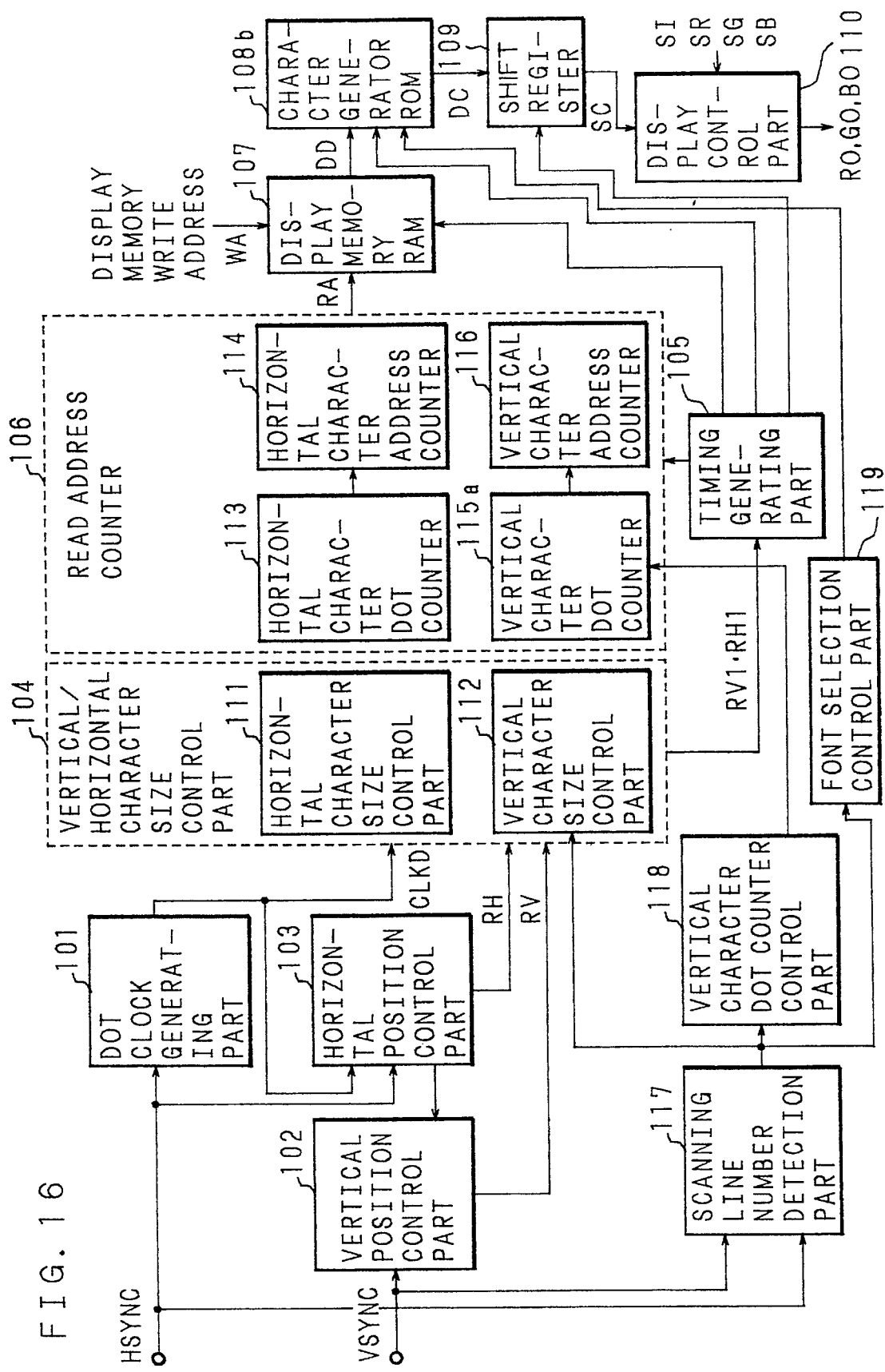
FIG. 16 is a block diagram showing a principal structure of an on-screen display apparatus according to a second preferred embodiment of the present invention.

Next, a second preferred embodiment of the present invention will be described with reference to FIG. 16. In FIG. 16, a character generator ROM 108b stores various kinds of font data with different vertical dot numbers for each character. The vertical dots form a character. The character generator ROM 108b receives signals from the output face data DD outputted from the display memory RAM 107 and signals outputted from the timing generating part 105 and a font selection control part 119 which will be described later and outputs the output font signal DC to the shift register 109. The font selection control part 119 receives an output from the scanning line number detection part 117, supplies a signal which corresponds to the detected number of the scanning lines to the character generator ROM 108b and selects font data which corresponds to the number of the scanning lines from various kinds of characters each of which differs from each other by the vertical dot number. The apparatus of the second preferred embodiment is otherwise similar to the apparatus of the preferred embodiment shown in FIG. 12, and therefore, like reference characters designate like or corresponding parts and a redundant description will be omitted.

In the on-screen display apparatus having such a structure, the scanning line number detection part 117 detects the number of scanning lines to be scanned by the input signal, the vertical character dot counter control part 118 controls the count value NV of the vertical character dot counter 115a in accordance with the detected number of the scanning lines, and the vertical character size control part 112 instructs the vertical character dot counter 115a to perform desired plural reading, whereby the size of a character in the vertical direction is adjusted and a display position of the character on the screen is maintained almost constant. Further, in accordance with the detected number of the scanning lines, the font selection control part 119 selects font data which has a suitable vertical dot number per character from the font data which are stored in the character generator ROM 108b, whereby the size of a character on the screen is maintained almost constant.

Figure 13:
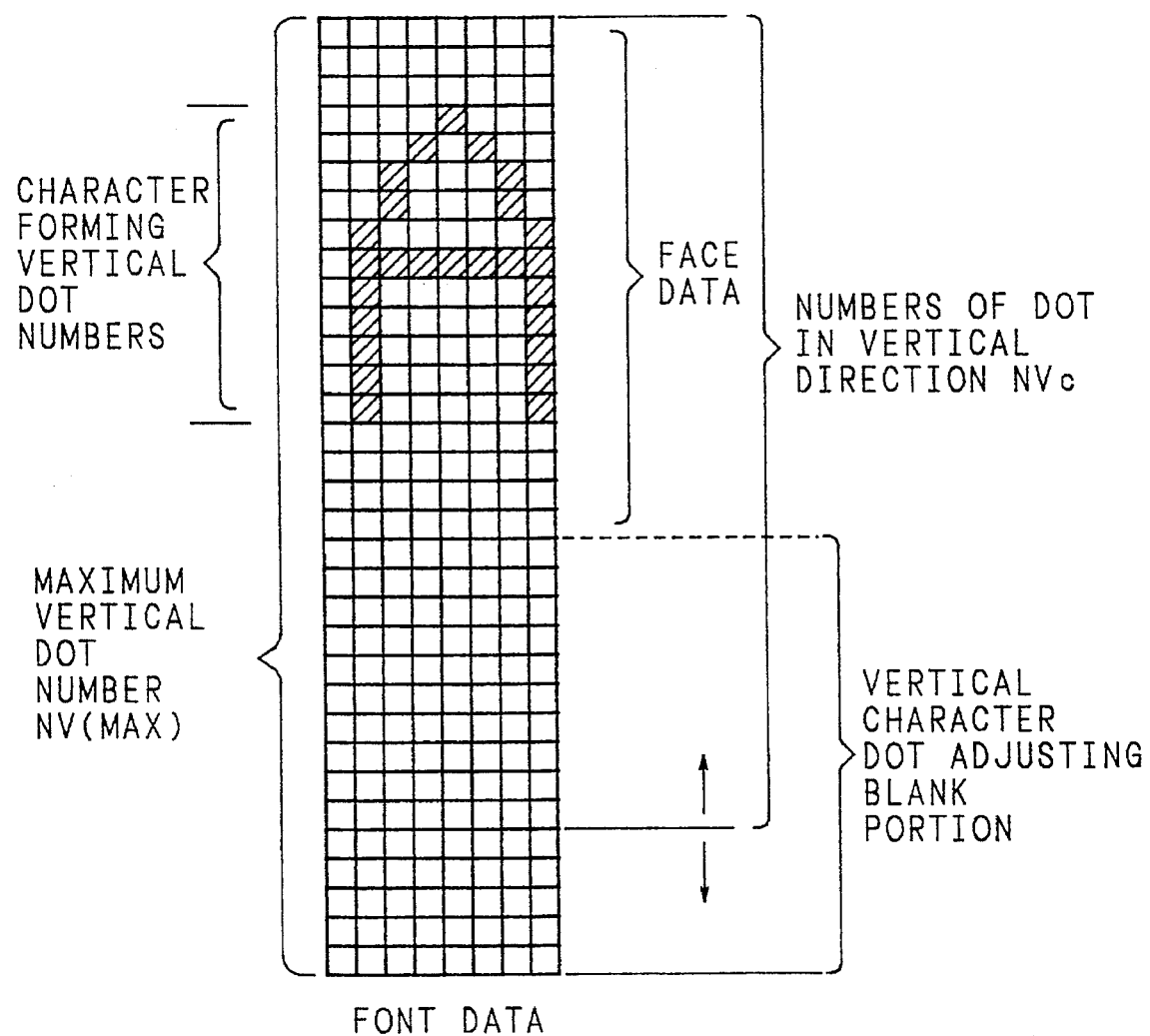
FIG. 13 is a view showing an example of a character which is stored in a character generator ROM in the first preferred embodiment.

TABLE 2 shows an example of the set value NV of the vertical character dot counter control part 118, setting of n times of reading by the vertical character size control part 112 and selection a font data of a kind of characters having respectively different vertical dot numbers by the font selection control part 119 in accordance with number of the scanning lines detected by the scanning line number detection part 117. As herein termed, of the face data, the character forming vertical dot number expresses the number of dots which actually form a character in the vertical direction as shown in FIG. 13.

For example, it is assumed that the number of the scanning lines is SV, the number of characters on the screen in the vertical direction is MV, the maximum vertical dot number of the font data stored in the character generator ROM 108b is NV(MAX), and the vertical dot number for each character is NVc. When the set value NV of the vertical character dot counter 115a and plural reading of dots are set similar to those set in the first preferred embodiment in accordance with the detected number of the scanning lines, it is possible to maintain the number and positions of characters displayed on the screen always constant.

Further, when font data is selected from the font data which are stored in the character generator ROM 108b in accordance with the detected number of the scanning lines as shown in TABLE 2, the size of a character displayed on the screen is maintained almost constant.

Figure 17:
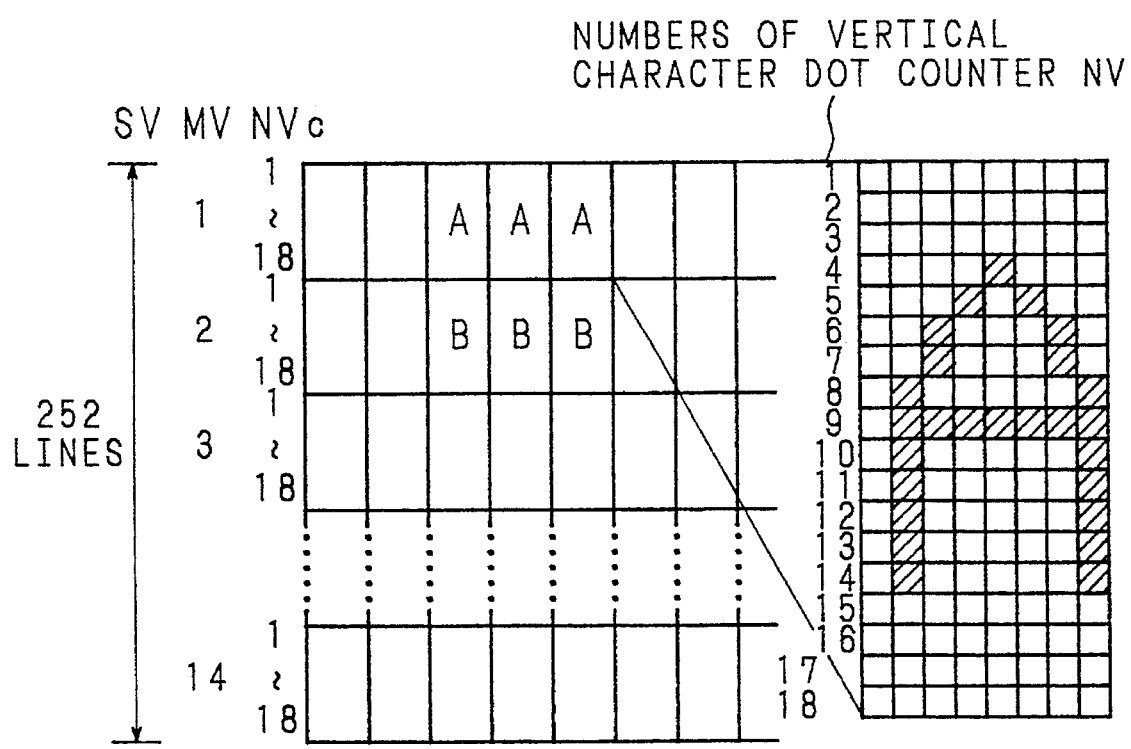
FIG. 17 is a view showing an example of a character display screen when an input signal scans 252 scanning lines in the second preferred embodiment.

As an example, where the input signal scans 252 scanning lines, the vertical character dot counter control part 118 calculates the vertical dot number NVc as in the first preferred embodiment, and the set value NV of the vertical character dot counter 115a is set 18. The dot counter is set to perform single reading so that the character generator ROM 108b outputs "font 1" which is formed by 11 dots in the vertical direction. FIG. 17 shows a character as it is displayed on the screen with this setting.

Figure 18:
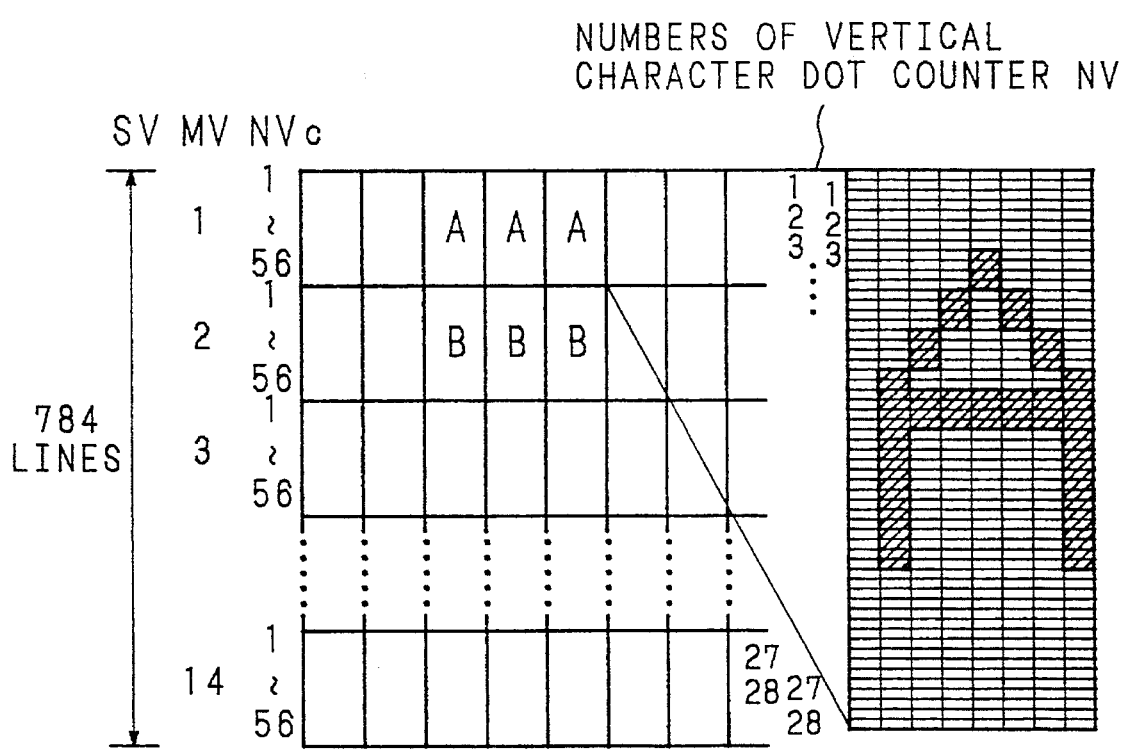
FIG. 18 is a view showing an example of a character display screen when an input signal scans 784 scanning lines in the second preferred embodiment.

Next, a signal to scan 784 scanning lines is inputted. In response to this, the vertical character dot counter control part 118 calculates the vertical dot number NVc as in the first preferred embodiment, the set value NV of the vertical character dot counter 115a is set 28 and the dot counter is set to perform double reading, whereby "font 3" which is formed by 16 dots in the vertical direction is outputted from the character generator ROM 108b. FIG. 18 shows a character as it is displayed on the screen with this setting. Thus, even when the number of the scanning lines is changed to 784, it is possible to maintain the number of characters displayed on the screen constant and positions of the displayed characters almost constant just like when the number of the scanning lines is 252. In addition, since font data which has an optimum character forming vertical dot number is selected in accordance with the number of the scanning lines in this embodiment, it is possible to maintain the size of a character to be displayed on the screen constant.

Thus, in accordance with the number of the scanning lines to be scanned an input signal, the vertical character dot counter control part 118 controls the count set value NV of the vertical character dot counter 115a, the vertical character size control part 112 controls n times of reading by the dot counter and font data which has a suitable vertical dot number per character is selected from the character generator ROM 108b which stores font data about various kinds of characters each of which differs vertical dot numbers in advance. Hence, it is possible to maintain positions and the number of characters displayed on the screen constant. It is also possible to maintain the size of a character to be displayed on the screen almost constant.

Third Preferred Embodiment

Figure 19:
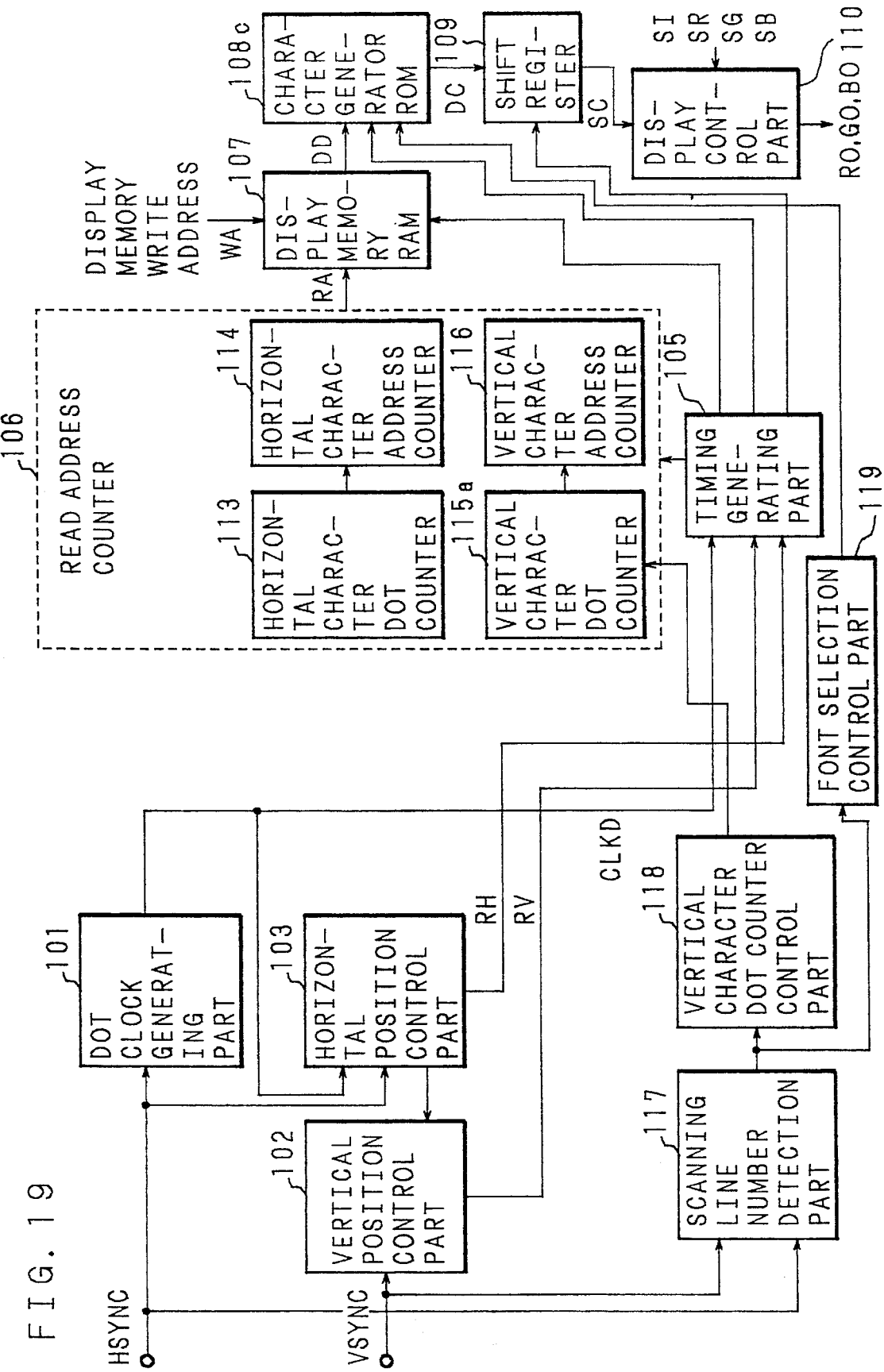
FIG. 19 is a block diagram showing a principal structure of an on-screen display apparatus according to a third preferred embodiment of the present invention.

If a character generator ROM 108c is used which stores more varieties of font data having different character forming vertical dot numbers, the vertical/horizontal character size control part 104 can be omitted from the structure of the second preferred embodiment while ensuring effects similar to those created in the second preferred embodiment as shown in FIG. 19. In an on-screen display apparatus according to a third preferred embodiment shown in FIG. 19, outputs from the dot clock generation part 101, the vertical position control part 102 and the horizontal position control part 103 are supplied to the timing generating part 105. The character generator ROM 108c stores font data about various kinds of characters each of which have more various number of vertical dots. The apparatus of the third preferred embodiment is otherwise similar to the apparatus of the second preferred embodiment (FIG. 16), and therefore, like reference characters designate like or corresponding parts and a redundant description will be omitted.

In accordance with the number of the scanning lines of the input signal detected by the scanning line number detection part 117, the vertical character dot counter control part 118 designates the count set value NV of the vertical character dot counter 115a. In accordance with the number of the scanning lines detected by the scanning line number detection part 117, the font selection control part 119 selects font data which are stored in the character generator ROM 108c, i.e., font data whose dot number per character is suitable to the number of the scanning lines. Hence, it is possible to maintain the number of characters displayed on the screen constant and positions and sizes of the displayed character almost constant even when the number of the scanning lines is changed, without using the vertical/horizontal character size control part 104.

TABLE 3 shows an example of setting of the set value NV of the vertical character dot counter 115a by the vertical character dot counter control part 118 and font selection by the font selection control part 119 in accordance with the number of the scanning lines detected by the scanning line number detection part 117. Assuming that the number of the scanning lines is SV and the number of characters on the screen in the vertical direction is MV, for example, the vertical dot number NVc for each character is expressed as:

$$NVc=INT(SV/MV) \qquad (9)$$

The set value NV of the vertical character dot counter 115a is set as:

$$NV=NVc \qquad (10)$$

Further, in accordance with the number of the scanning lines, the font selection control part 119 selects suitable font data from a plurality types of font data having different character forming vertical dot numbers as those shown in TABLE 3.

Figure 20:
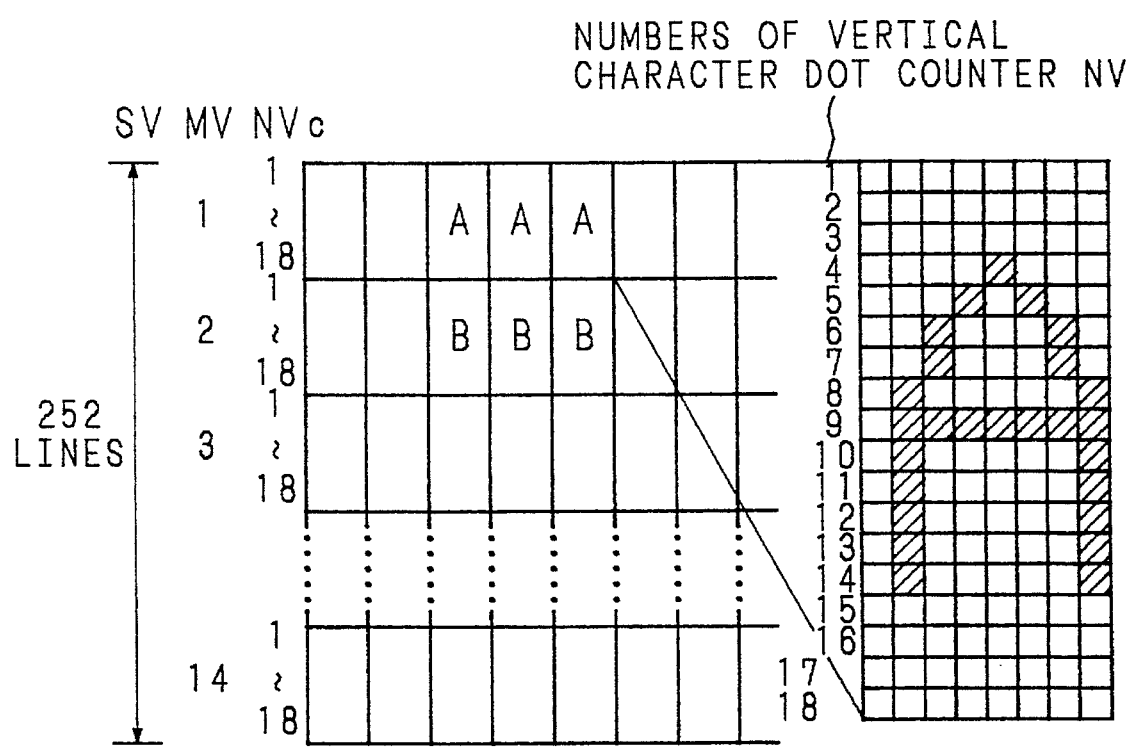
FIG. 20 view showing an example of a character display screen when an input signal scans 252 scanning lines in the third preferred embodiment.

It is assumed that the input signal scans 252 scanning lines, for example. As in the first preferred embodiment, where the number of characters displayed in one screen picture in the vertical direction is 14, the vertical character dot counter control part 118 calculates the set value NV of the vertical character dot counter 115a as 18, and "font 1" which is formed by 11 dots in the vertical direction is selected from the character generator ROM 108c in accordance with a control signal supplied from the font selection control part 119. FIG. 20 shows a character as it is displayed on the screen with this setting.

Figure 21:
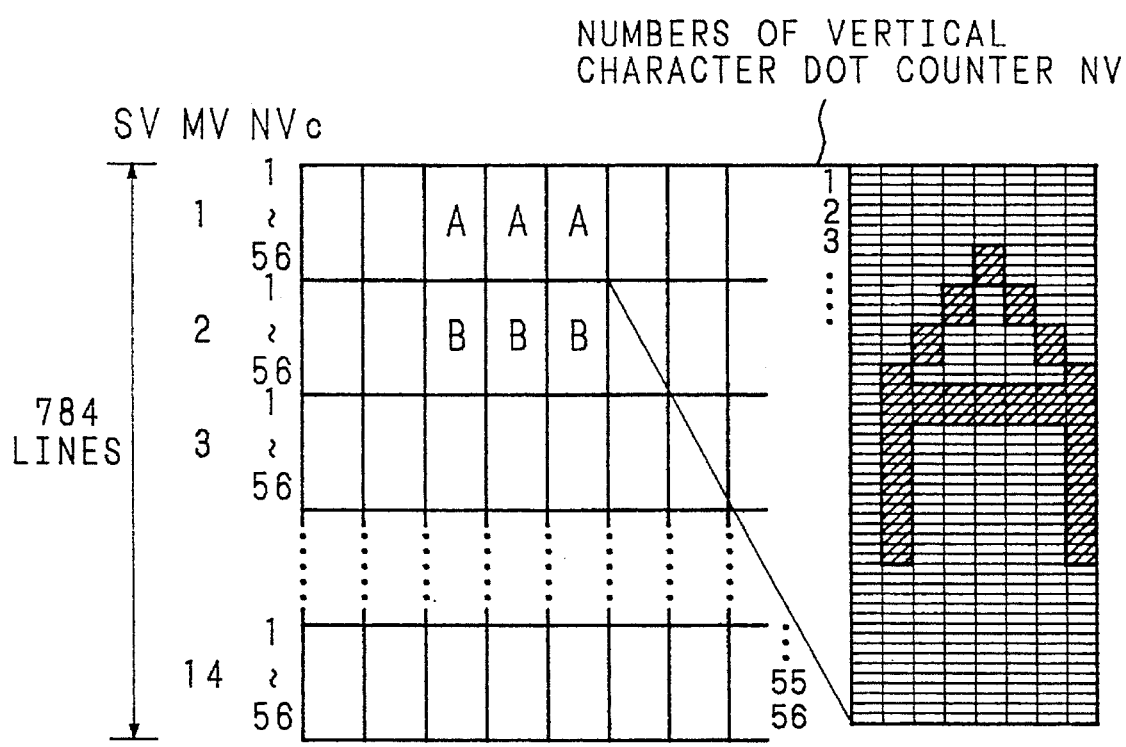
FIG. 21 is a view showing an example of a character display screen when an input signal scans 784 scanning lines in the third preferred embodiment.

Now, in a case where the input signal scans 784 scanning lines, the vertical character dot counter control part 118 sets the set value NV of the vertical character dot counter 115a as 56 and the font selection control part 119 selects "font 7" which is formed by 32 dots in the vertical direction. FIG. 21 shows a character as it is displayed on the screen with this setting. As in the second preferred embodiment, it is possible to maintain positions, the number and sizes of characters displayed on the screen constant.

Fourth Preferred Embodiment

Next, a fourth preferred embodiment will be described with reference to associated drawings. In the on-screen display apparatus according to each one of the embodiments above of the present invention, it is possible to maintain the number, positions, sizes, etc. of characters which are displayed on the screen approximately constant no matter how the number of the scanning lines scanned by an input signal changes. In each embodiment above, attributes of characters are changed screen picture by screen picture in principle. In the following, a description will be given on a simple on-screen display apparatus which can change attributes character by character on the display screen.

Figure 22:
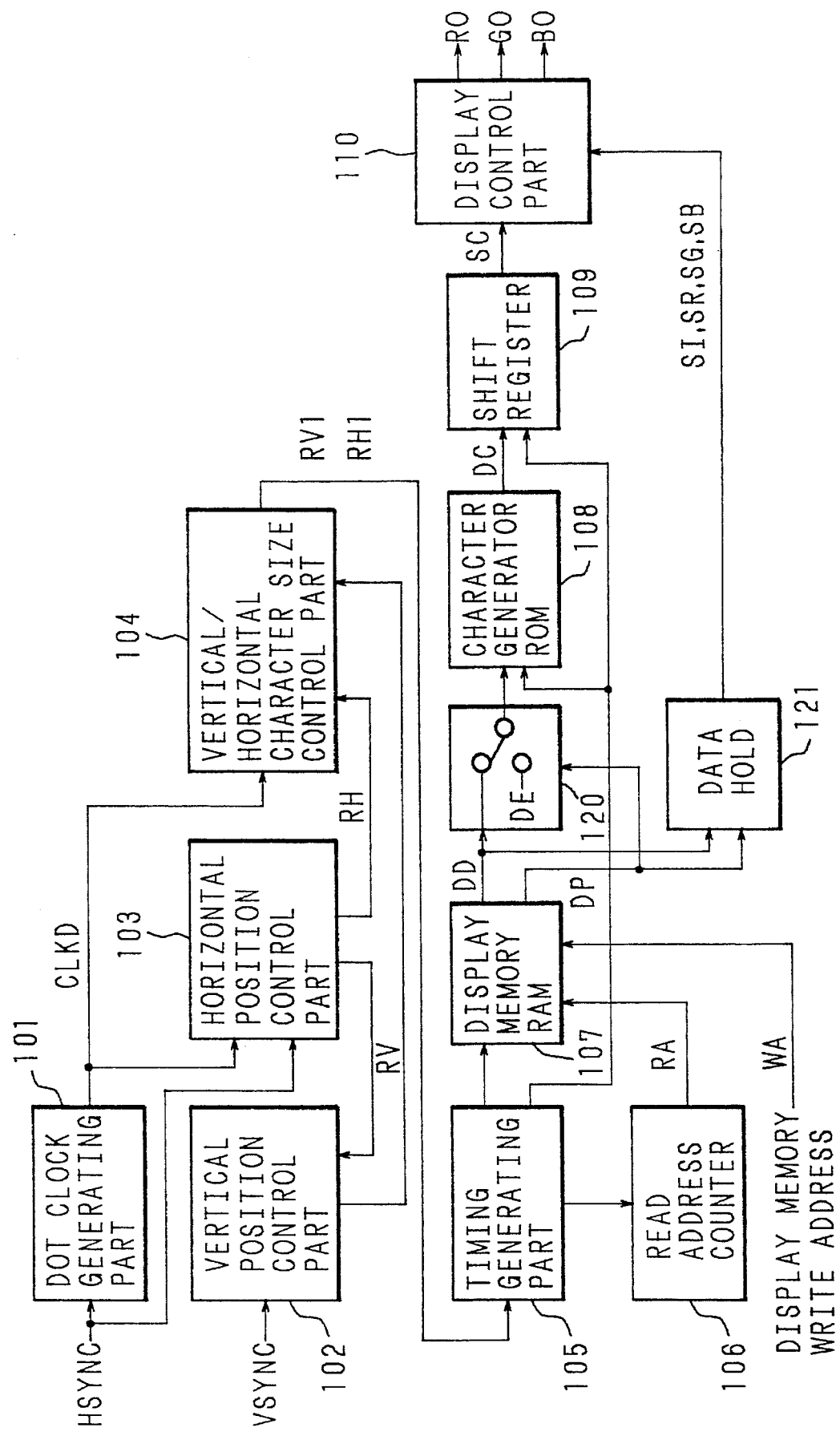
FIG. 22 is a block diagram showing a principal structure of an on-screen display apparatus according to a fourth preferred embodiment of the present invention.

FIG. 22 is a block diagram showing a structure of an on-screen display apparatus according to the fourth preferred embodiment. In FIG. 22, the display memory RAM 107 outputs the output face data DD to a memory data change switch 120, so that an identification bit signal DP which is included in the output face data DD is supplied to the memory data change switch 120. Fixed data DE is stored in the memory data change switch 120 in advance. Based on the identification bit signal DP, the memory data change switch 120 outputs either the output face data DD or the fixed data DE to the character generator ROM 108. The output face data DD and the identification bit signal DP from the display memory RAM 107 are supplied to a data hold 121. Of the data allowed into the display memory RAM 107 in response to the identification bit signal DP, the data hold 121 holds only attribute control bits which are necessary in the display control part 110 and outputs the non-reverse/reverse control signal SI and ON/OFF control signals SR, SG and SB to the display control part 110. The apparatus of the fourth preferred embodiment is otherwise similar to the apparatuses of the first to the third preferred embodiments as they are without the function of detecting the number of the scanning lines. Like reference characters designate like or corresponding parts and a redundant description will be omitted.

Figure 1:
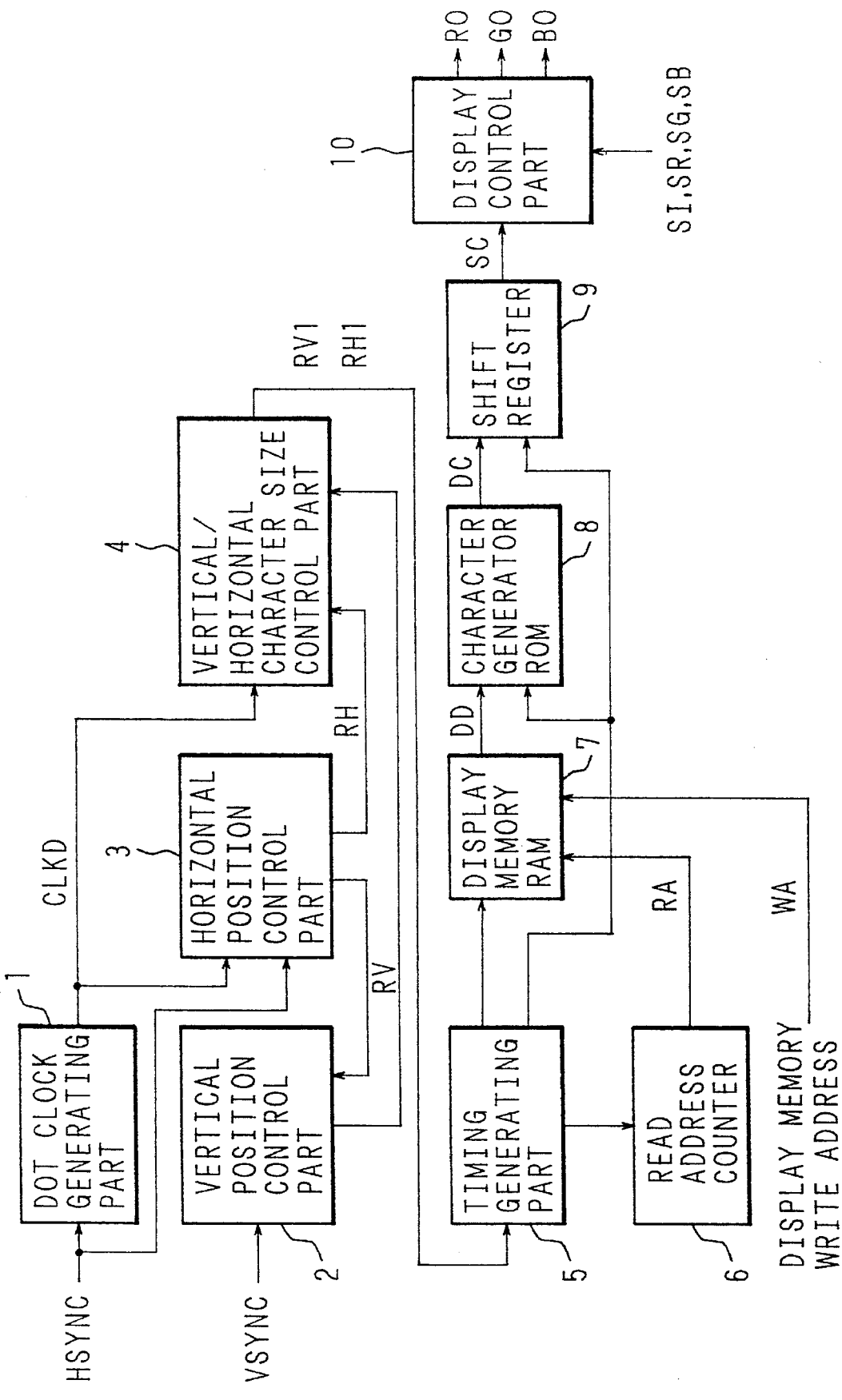
FIG. 1 a block diagram showing a principal structure of a conventional on-screen display apparatus.
Figure 2:
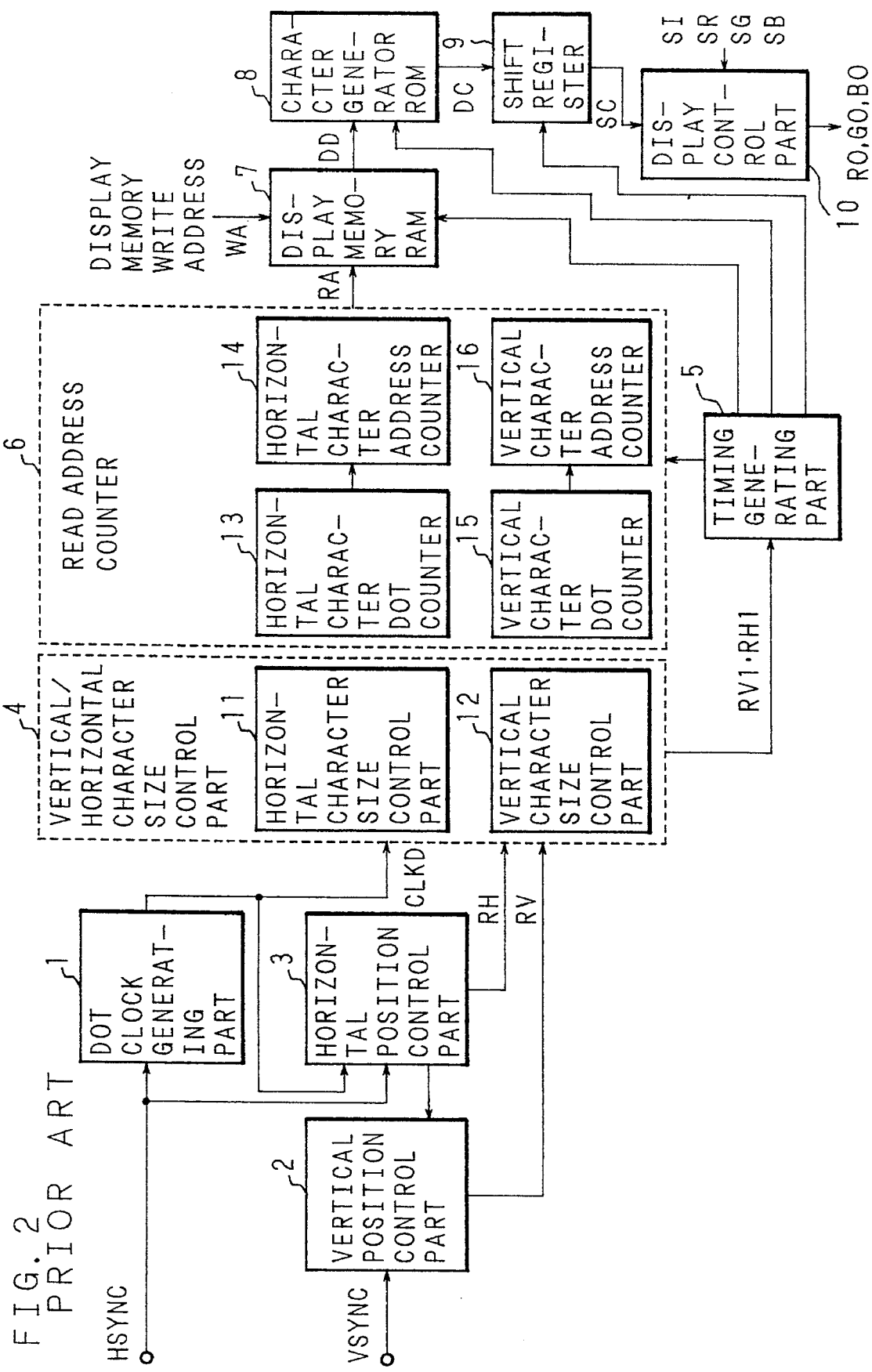
FIG. 2 is a block diagram showing a principal structure of a conventional on-screen display apparatus.
Figure 3:
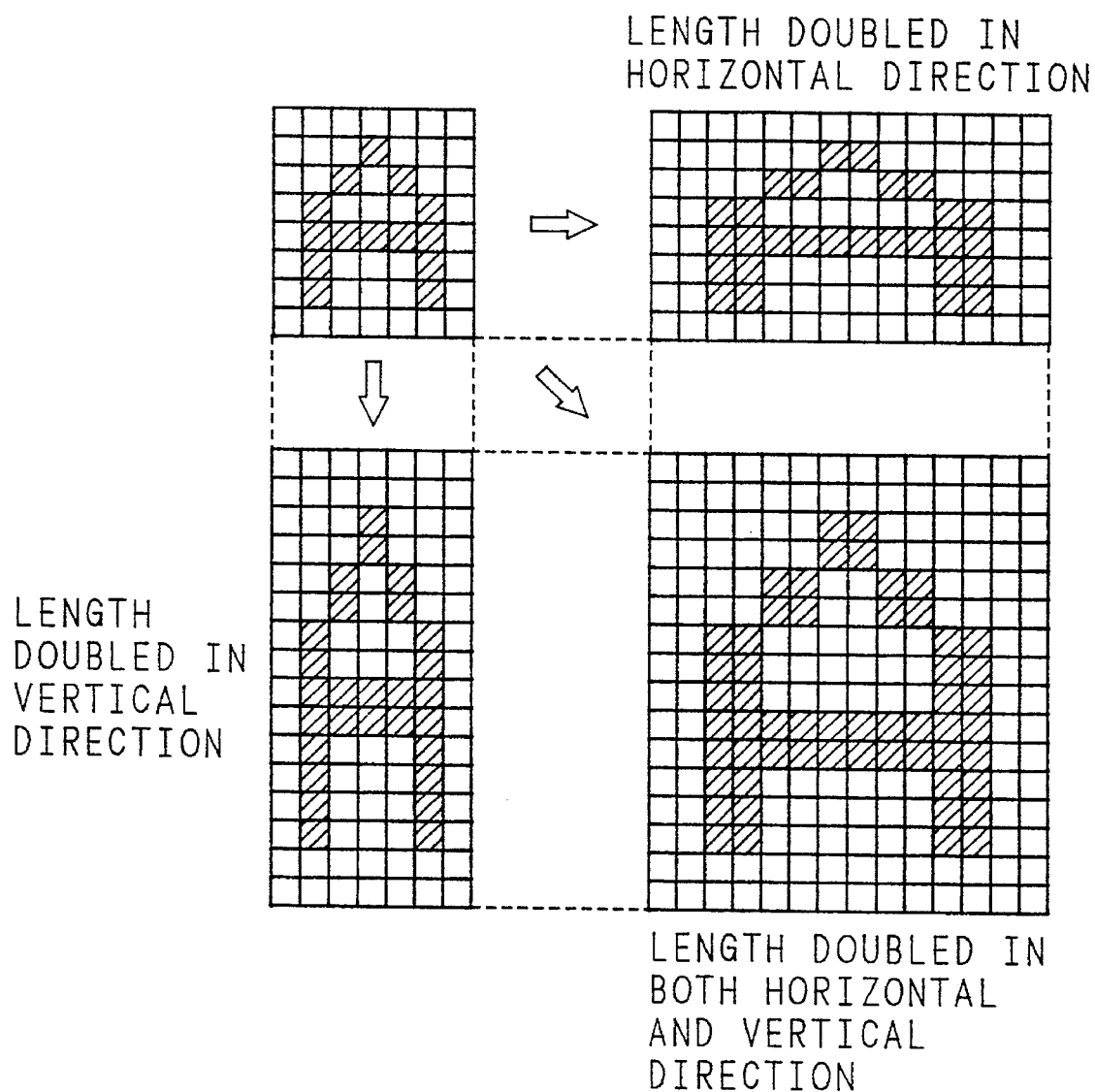
FIG. 3 is a view showing a character which is displayed on a screen when a vertical/horizontal character size control part of FIG. 2 operates.
Figure 4:
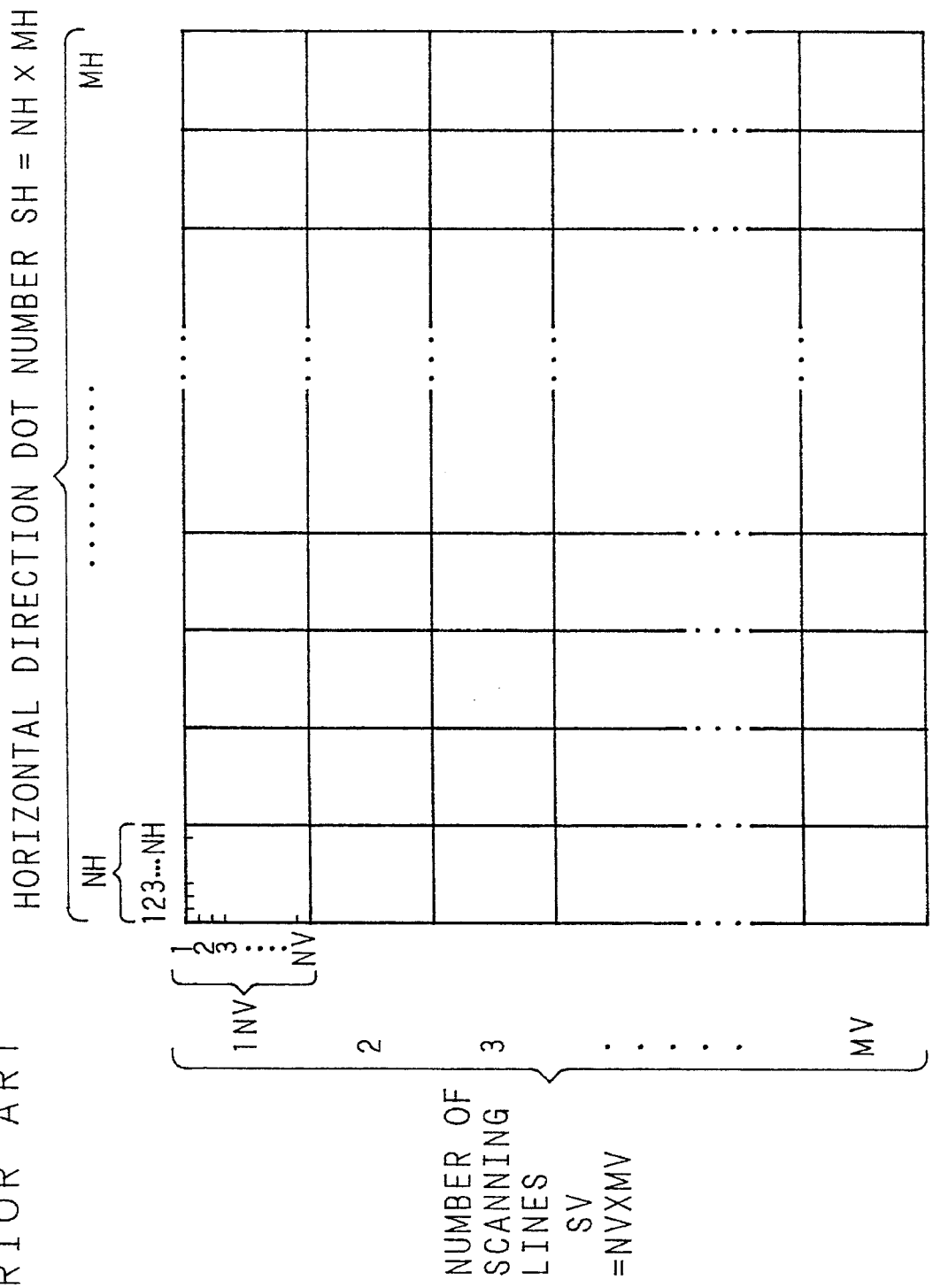
FIG. 4 is a view showing a screen structure in a conventional on-screen display apparatus.
Figure 5:
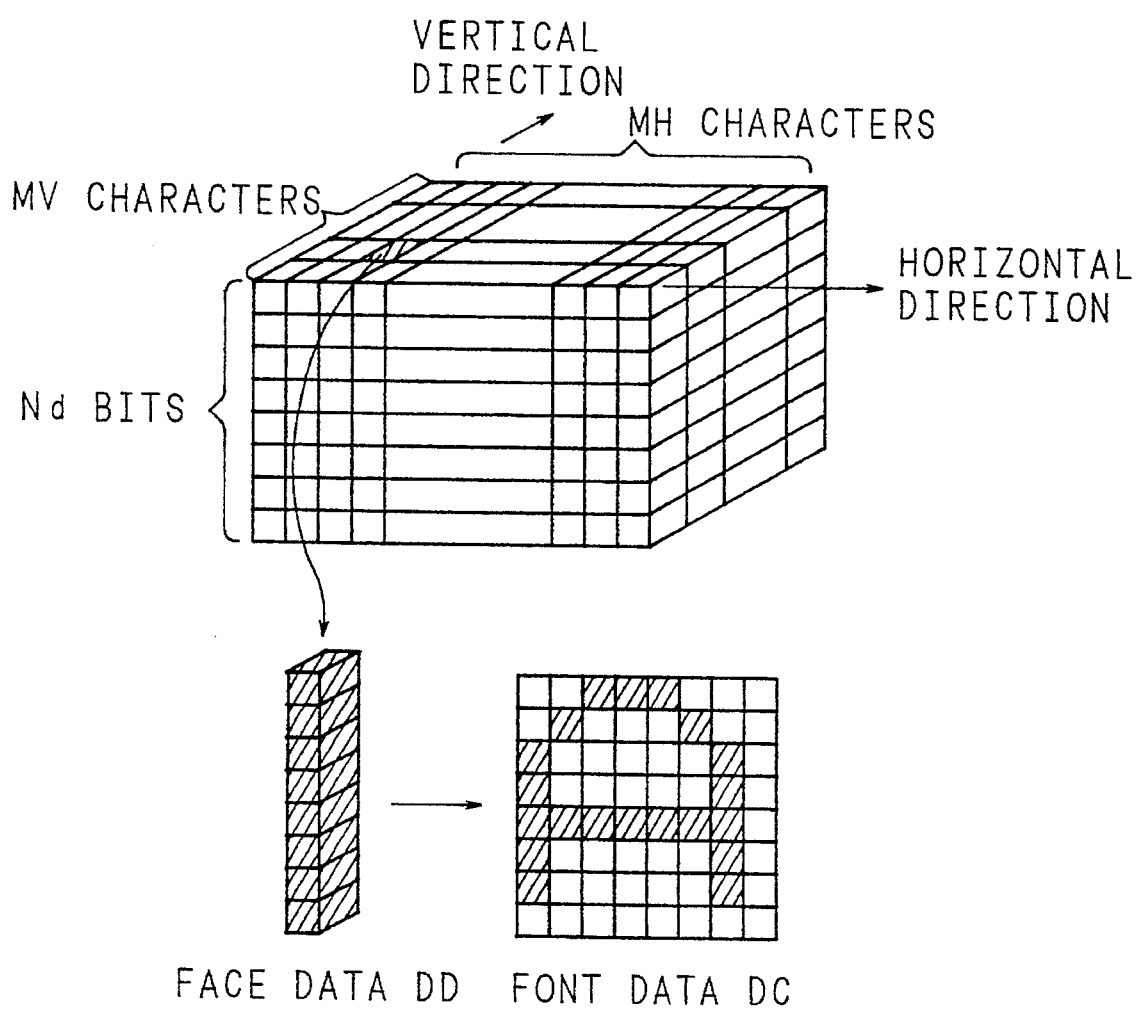
FIG. 5 is a view showing a data structure of a display memory RAM of FIG. 2.
Figure 6:
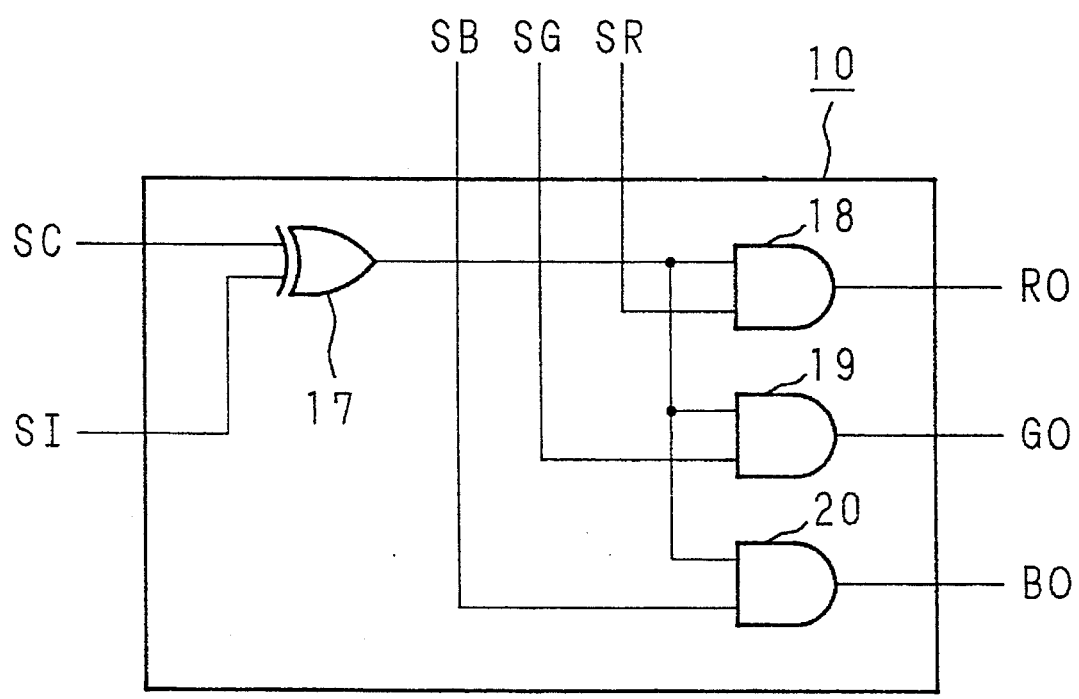
FIG. 6 is a block circuitry diagram showing an example of a structure of a display control part of FIG. 2.
Figure 7:
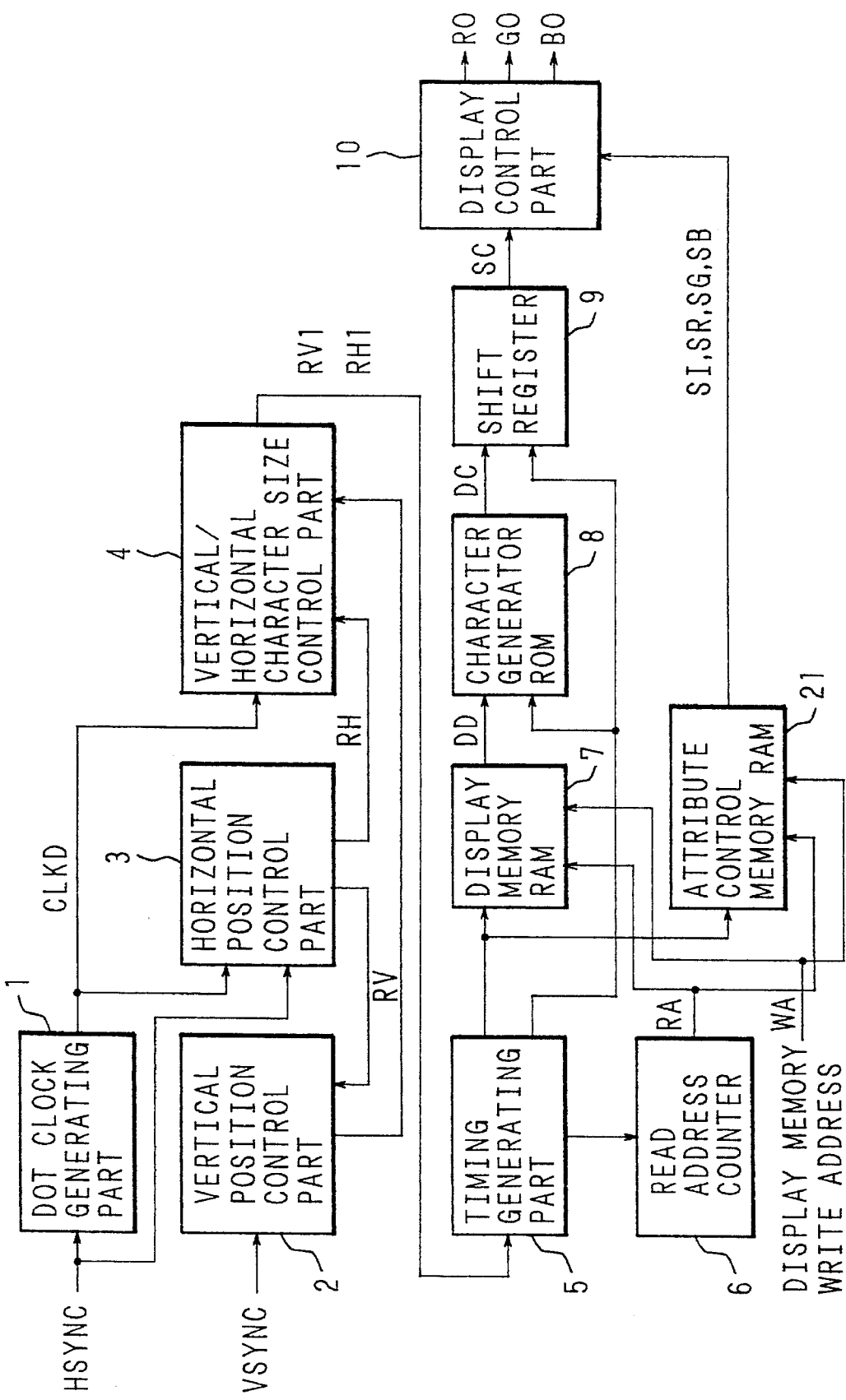
FIG. 7 is a block diagram showing a principal structure of another conventional on-screen display apparatus.
Figure 8:
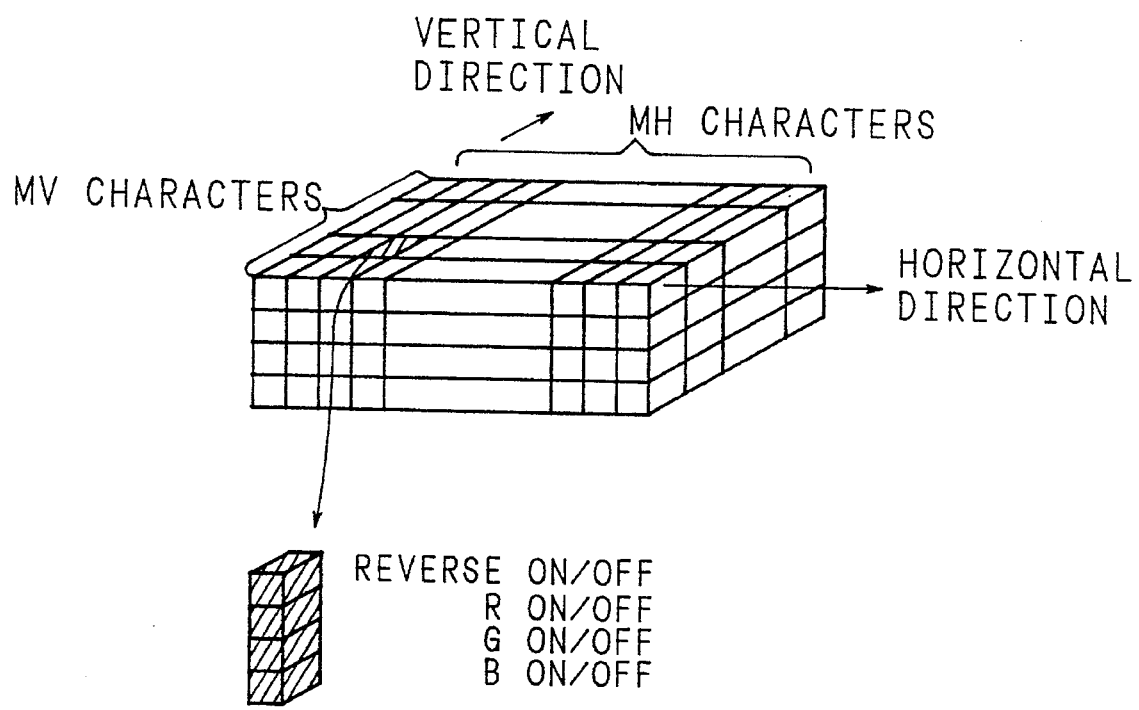
FIG. 8 is a view showing a data structure of a display memory RAM of FIG. 7.
Figure 9:
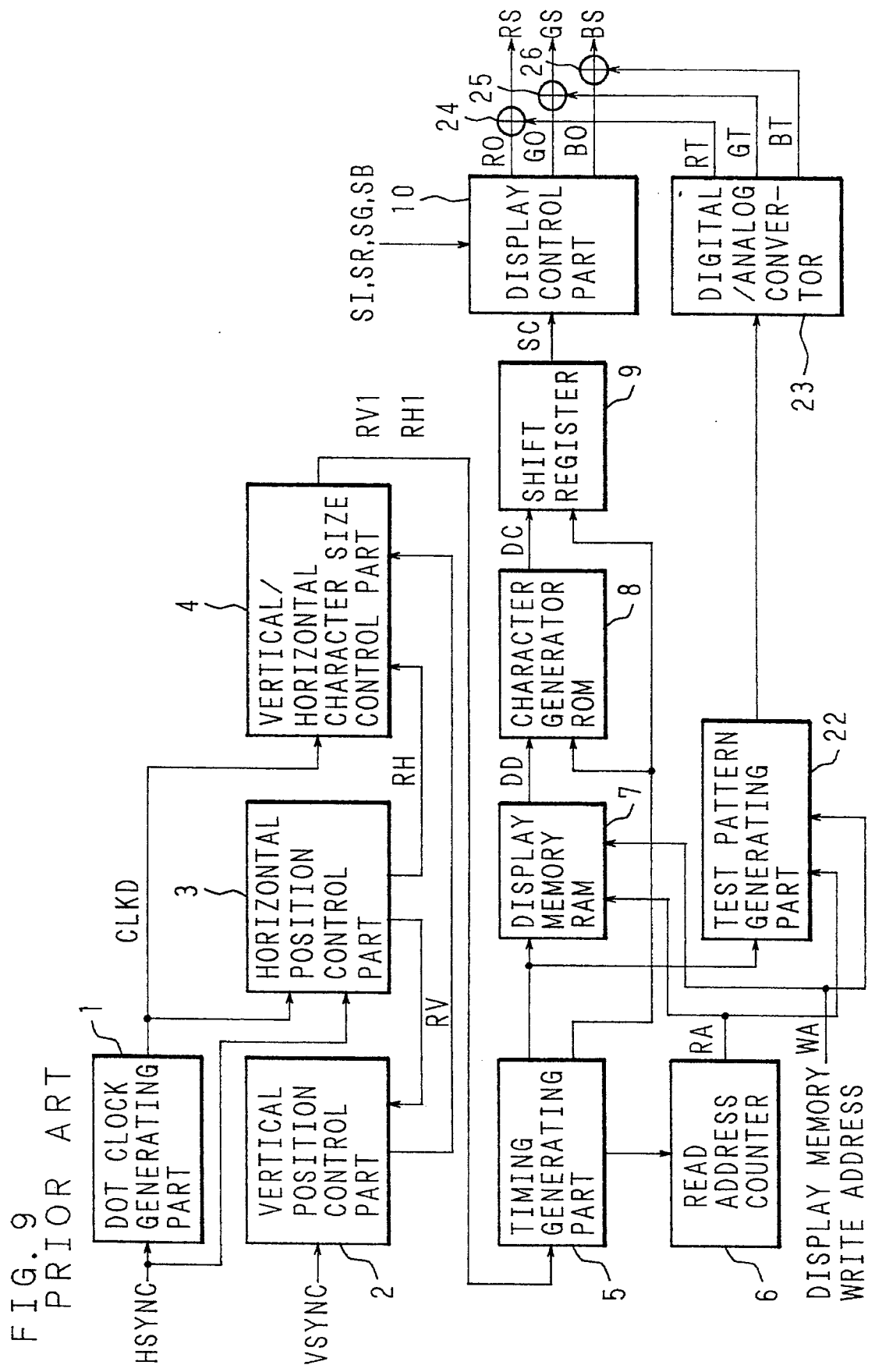
FIG. 9 is a block diagram showing a principal structure of another conventional on-screen display apparatus.
Figure 10:
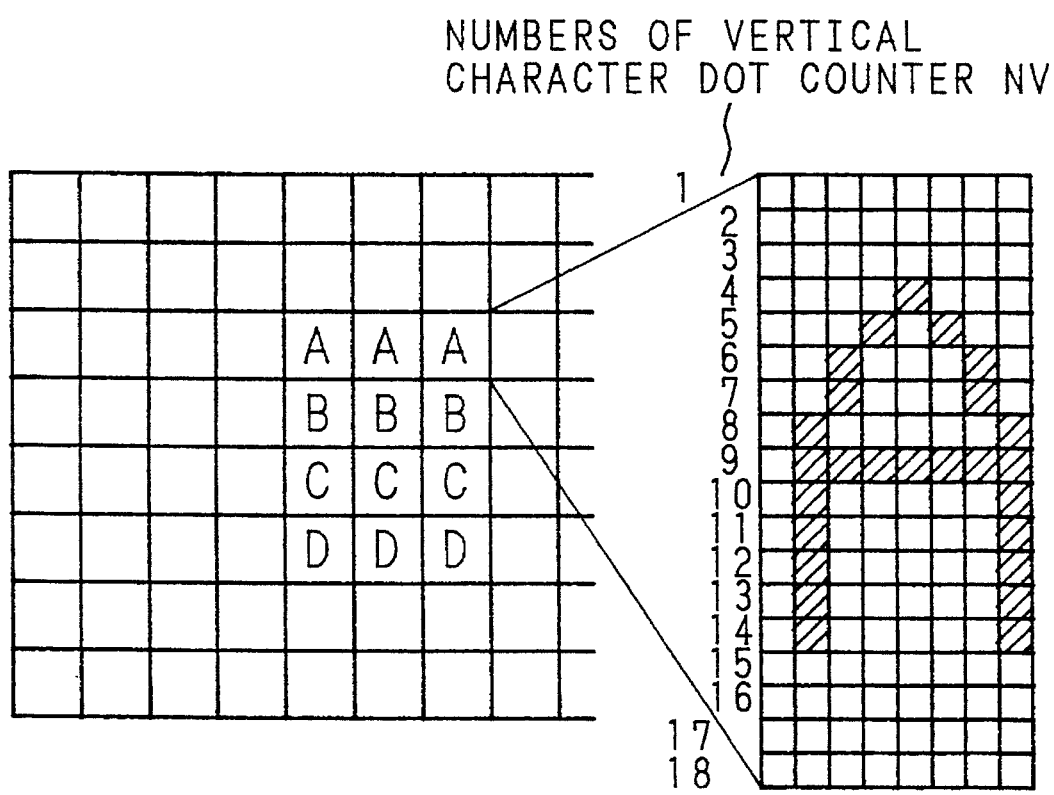
FIG. 10 is a view showing an example of a character which is displayed on a screen when an NTSC signal is supplied to a conventional on-screen display apparatus input signal.
Figure 11:
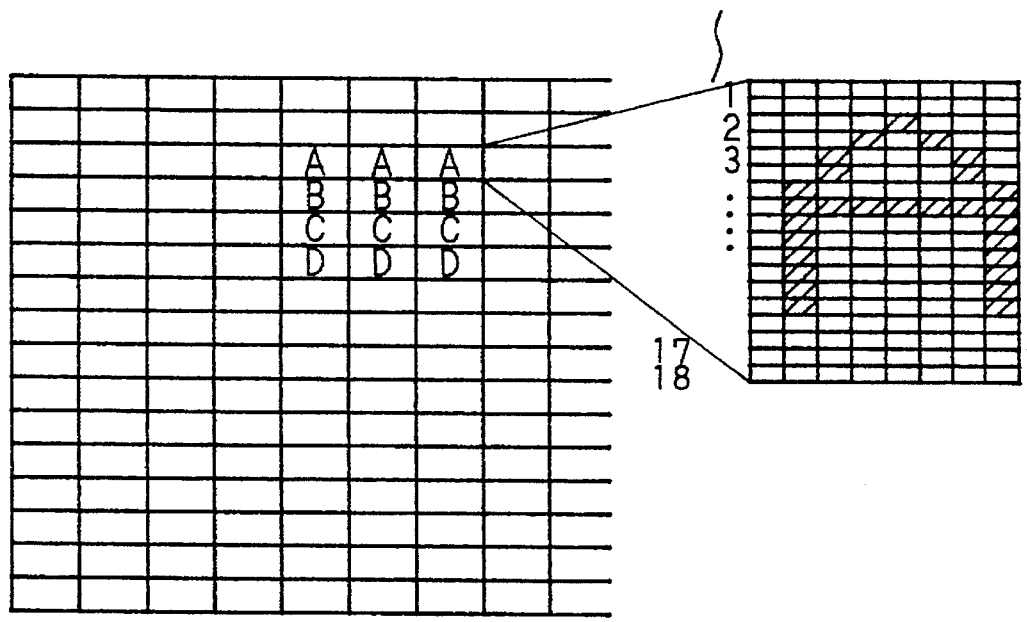
FIG. 11 is a view showing an example of a character which is displayed on a screen when an EDTV signal, which scans twice as many scanning lines as an NTSC signal, is supplied to a conventional on-screen display apparatus as an input signal.
Figure 23:
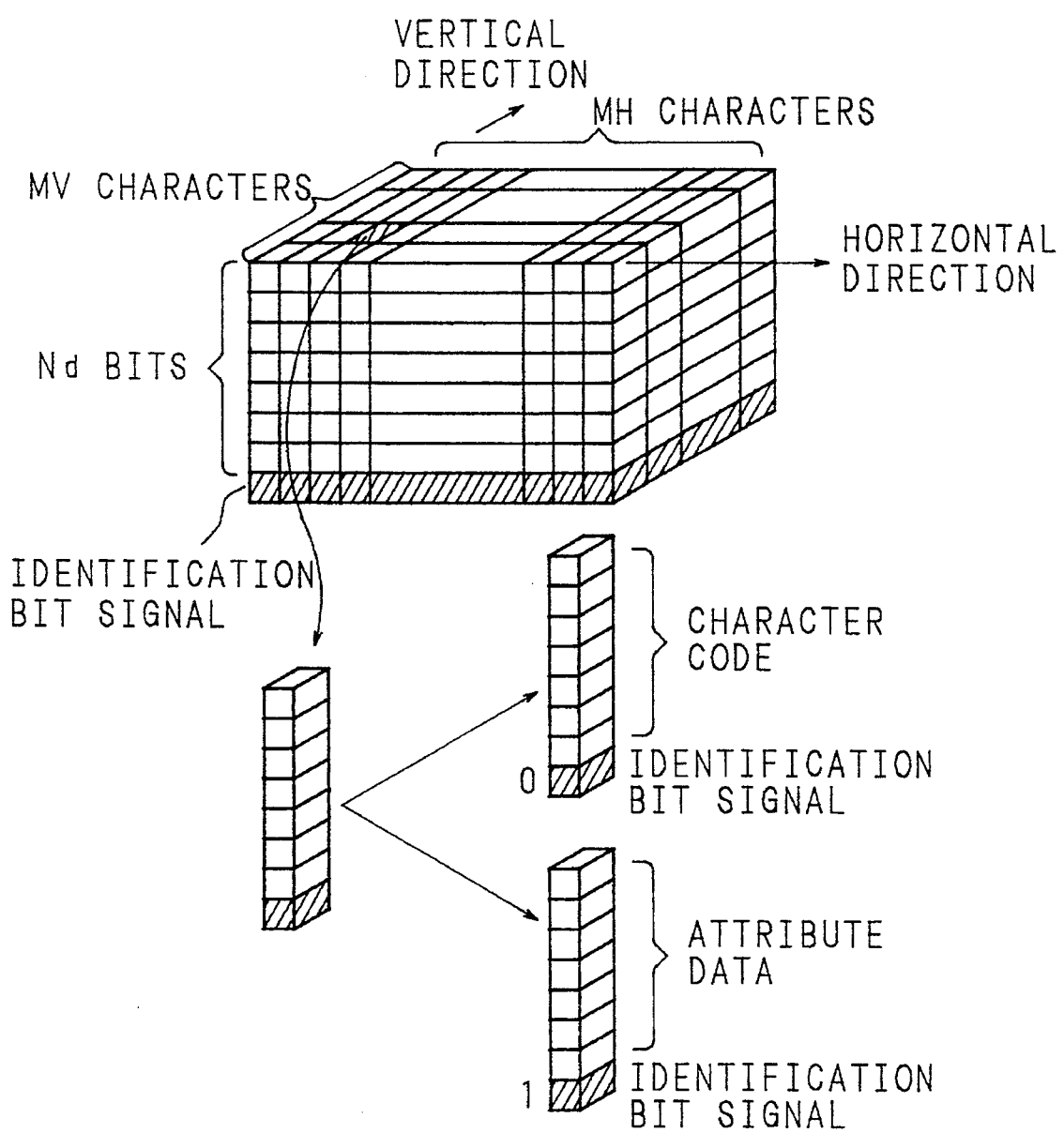
FIG. 23 is a view showing a data structure of a display memory RAM of the fourth preferred embodiment.

An operation of the on-screen display apparatus having such a structure will be described in the following. FIG. 23 is a view showing the data structure of a display memory RAM 107. FIG. 23 corresponds to FIG. 5 which was referred to in relation to the conventional apparatus. A character code of Nd bits is written in a memory map area which corresponds to a display area on the screen and which measures MH characters in the horizontal direction and MV characters in the vertical direction. In addition to the character code of Nd bits, a memory area of minimum 1 bit is reserved for identification of data, and binary data is assigned to the memory area. In the memory area in which the character code of Nd bits is written, a character code similar to a conventional code is written when the identification bit signal DP has a value 0, but attribute data for font display control is written when the identification bit signal DP has a value 1.

Hence, in the embodiment shown in FIG. 22, the identification bit signal DP indicating binary data is used as a switch signal which is needed for the memory data change switch 120 to perform switching. The memory data change switch 120 performs switching so as to output the output face data DD from the display memory RAM 107 when the identification bit signal DP has a value 0, but the fixed data DE set in the memory data change switch when the identification bit signal DP has a value 1. The fixed data DE are font cedes for solid black, i.e., codes which do not display a character.

In such a structure, the output face data DD is supplied to the character generator ROM 108 from the display memory RAM 107 when the identification bit signal DP has a value 0, but the fixed data DE is supplied to the character generator ROM 108 when the identification bit signal DP has a value 1. The data hold circuit 121 holds precedent data when the identification bit signal DP has a value 0 and updates the data, that is, changes from character cedes to attribute data when the identification bit signal DP has a value 1.

Figure 24:
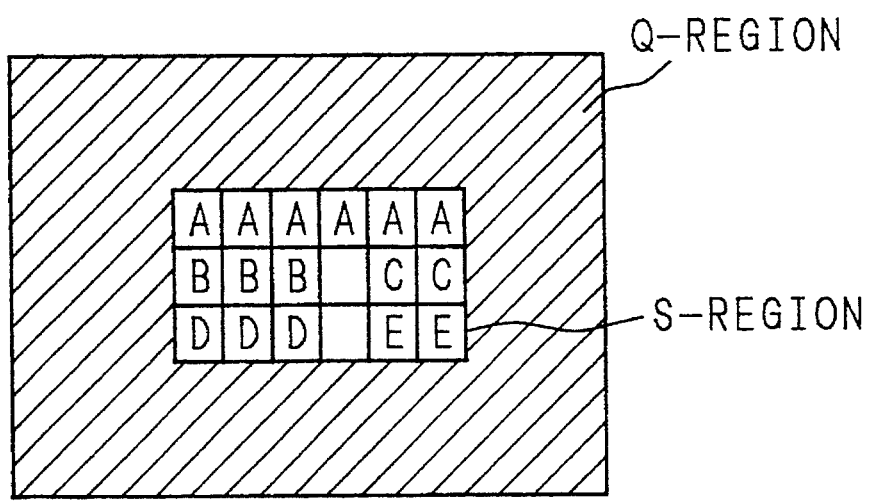
FIG. 24 is a view showing an example of a screen picture which is displayed by the on-screen display apparatus according to the fourth preferred embodiment.

An example of a specific operation of the present embodiment will be described with reference to FIGS. 24 and 25. For example, FIG. 24 shows a screen picture to be displayed. A Q-region should be blank (nothing should be displayed) and various characters should be displayed in an S-region. In the S-region, six white letters "A" are displayed in the first line. Three red letters "B," a blank of one character and two green letters "C" are displayed in the second line. Three blue inverted letters "D" are displayed in the third line. A blank of one character and two purple inverted letters "E" are displayed in the fourth line.

Figure 25:
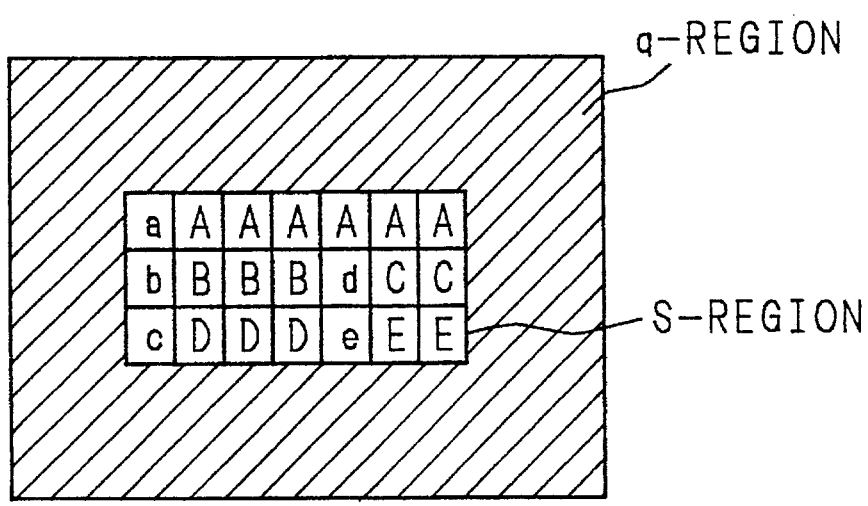
FIG. 25 is a view for describing an identification bit signal used in the display memory RAM of the fourth preferred embodiment.

In this case, as shown in FIG. 25, in a q-region and regions for displaying the letters A, B, C, D and E of an S-region of the display memory RAM 107, the identification bit signal DP has a value 0 so that character codes which correspond to the screen are written in a character code memory area of Nd bits of the display memory RAM 107. In regions a, b, c, d and e one letter ahead (left side in FIG. 25) of the letters A, B, C, D and E to be written, the identification bit signal DP has a value 1 so that the attribute data as shown in TABLE 4, for example, are written in an order in the character code memory area of Nd bits from the most significant bit side.

Signals of bits which correspond to the attribute data assigned from the most significant bit side are supplied to the data hold circuit 121, and the data hold circuit 121 holds and outputs the signals. The non-reverse/reverse control signal SI and ON/OFF control signals SR, SG and SB are supplied to associated control terminals of the display control part 110 from the data hold circuit 121, whereby the on-screen display picture shown in FIG. 24 is obtained.

Fifth Preferred Embodiment

Figure 26:
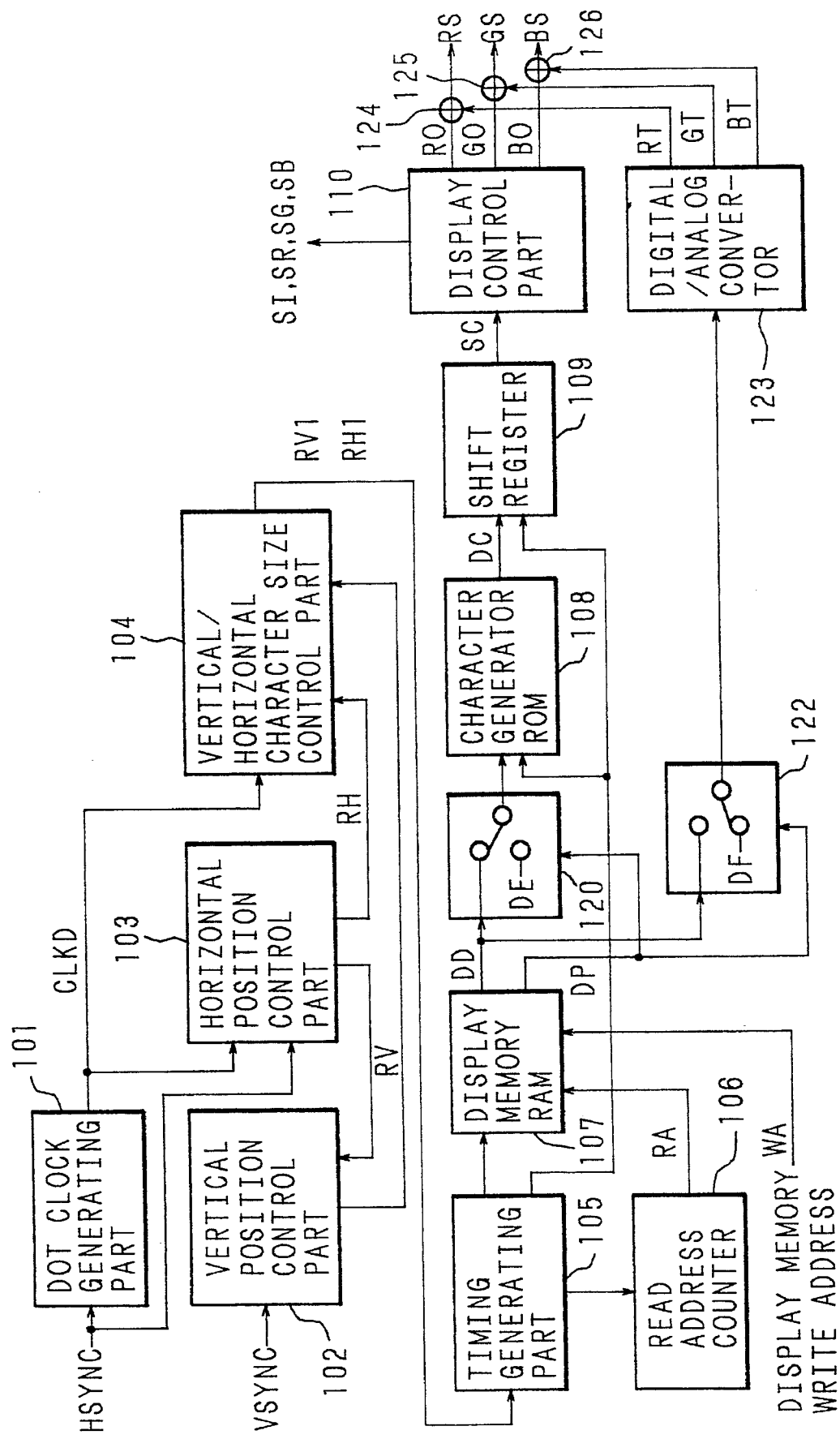
FIG. 26 is a block diagram showing a principal structure of an on-screen display apparatus according to a fifth preferred embodiment of the present invention.

Next, a fifth preferred embodiment will be described. FIG. 26 is a block diagram of an on-screen display apparatus according to the fifth preferred embodiment of the present invention. The display memory RAM 107 outputs the output face data DD to a first memory data change switch 120 and a second memory data change switch 122, so that the identification bit signal DP which is included in the output face data DD is supplied to the first and the second memory data change switches 120 and 122 for switch control. Fixed data DE and DF are stored in the first and the second memory data change switches 120 and 122, respectively, in advance. The first memory data change switch 120 outputs either the output face data DD or the fixed data DE to the character generator ROM 108 in accordance with the identification bit signal DP. The second memory data change switch 122 outputs either the output face data DD or the fixed data DF to a digital/analog convertor 123 in accordance with the identification bit signal DP. The first and the second memory data change switches 120 and 122 have opposite switching characteristics to each other with respect to the identification bit signal DP. The apparatus of the fifth preferred embodiment is otherwise similar to the apparatus of the fourth preferred embodiment, and therefore, like reference characters designate like or corresponding parts and a redundant description will be omitted.

In the on-screen display apparatus having such a structure, the fixed data DE is outputted from the first memory data change switch 120 while the output face data DD of the display memory RAM 107 is outputted from the second memory data change switch 122 when the identification bit signal DP has a value 1. When the identification bit signal DP has a value "0," the output face data DD is outputted from the first memory data change switch 120 while the fixed data DF is outputted from the second memory data change switch 122. The fixed data DF is data 0, for example, for outputting level 0 in the digital/analog convertor 123.

The signals RT, GT and BT outputted from the digital/analog convertor 123 are supplied to an R-adder 124, a G-adder 125 and a B-adder 126, respectively, and added to the font signals RO, GO and BO which have controlled display, whereby the output signals RS, GS and BS are obtained.

Figure 27:
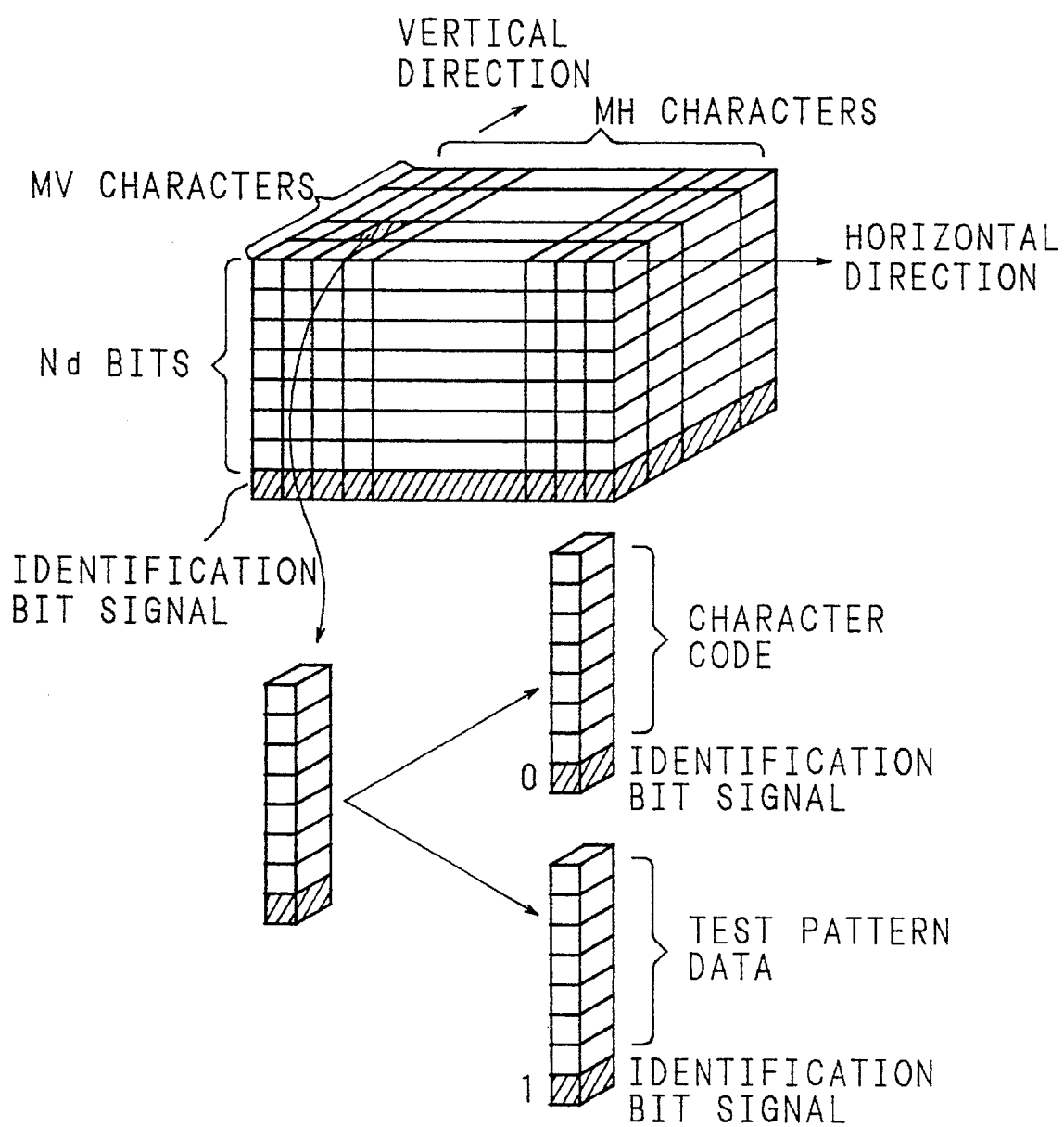
FIG. 27 is a view showing a data structure of a display memory RAM of the fifth preferred embodiment.
Figure 28:
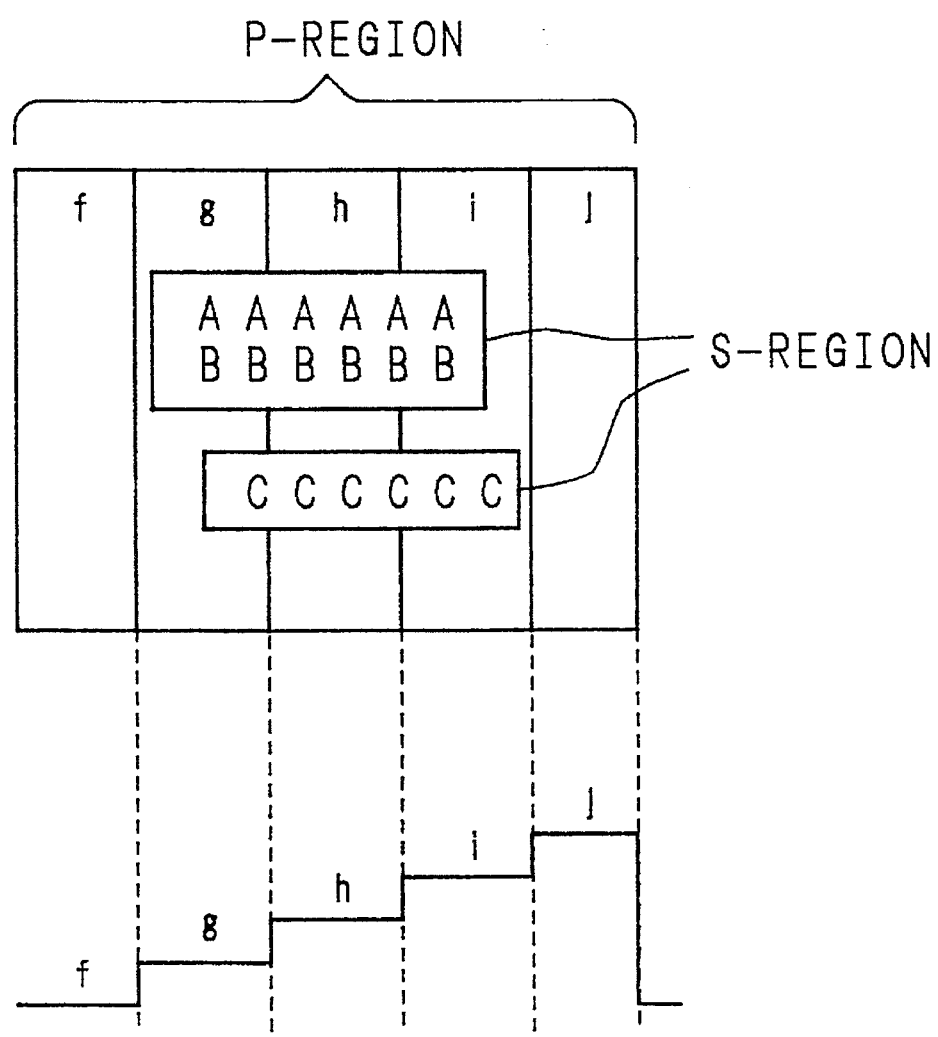
FIG. 28 is a view showing an example of a screen picture which is displayed by the on-screen display apparatus according to the fifth preferred embodiment.

An operation of the fifth preferred embodiment will be described with reference to FIGS. 27 and 28. In FIGS. 27 and 28, a P-region and an S-region show an example of a displayed screen picture. A stepped test pattern signal having levels f, g, h, i and j is also shown which creates the P-region. In this case as well as in the fourth preferred embodiment, the identification bit signal DP has a value 0 in the S-region of the display memory RAM 107 displaying a character while the identification bit signal DP has a value 1 in the P-region of the display memory RAM 107 displaying a stepped wave. Face data corresponding to the screen is written in character code memory area of the S-region of the display memory RAM 107. With respect to data of the P-region as well, stepped wave test pattern data is written in the display memory RAM 107 so that an output from the digital/analog convertor 123 has a stepped wave-like level as shown in FIG. 28. Data are written in the display memory RAM 107 in the manner above so that the on-screen display picture shown in FIG. 28 is obtained.

Data such as a set value Vc of a vertical character dots corresponding to the number of scanning lines, a predetermined number of plural reading and types of fonts as those shown in TABLE 1 to TABLE 3 may be stored in a data base not shown, so that necessary data are read from the data base after detecting the number of scanning lines. Alternatively, these data may be prepared in the respective component parts which need particular data.

As described above, the on-screen display apparatus and method according to the present invention controls a vertical dot number of font data read by the memory means in accordance with the detected number of scanning lines and the number of dots for which the counter counts up. Hence, it is possible to maintain the number and positions of characters which are displayed on the screen constant even when the number of the scanning lines is changed.

In addition, in the on-screen display apparatus and method according to the present invention, font data corresponding to the number of scanning lines is selected from various kinds of font data respectively having different vertical dot numbers forming face data. Hence, it is possible to maintain the number and positions of characters which are displayed on the screen constant and it is also possible to maintain sizes of the displayed characters almost constant even when the number of the scanning lines is changed.

In the on-screen display apparatus and method according to the present invention, since said memory means stores various kinds of font data having more various numbers of vertical dots, the size of a character is determined by selection of font data. This reduces the circuit size without using a size control part.

In the on-screen display apparatus and method according to the present invention, it is possible to write two types of data, i.e., the face data for selecting font data and the attribute data for controlling display of characters, in the display memory. Hence, using the identification signal for identifying the two types of data, the two types of data are used appropriately. By means of a little increase in the number of bits in the display memory, it is possible to control attributes of each character which is displayed on the screen.

In the on-screen display apparatus and method according to the present invention, it is possible to write two types of data, i.e., the face data for selecting font data and the test pattern data, in the display memory. Hence, using the identification signal for identifying the two types of data, the two types of data are used appropriately. Only if the number of bits in the display memory is increased a little, the conventional on-screen display apparatus can have a function of generating a test pattern such as a gray scale and a window pattern.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

TABLE 1

| SCANNING LINES OF INPUT SIGNAL SV | COUNT SET VALUE OF VERTICAL CHARACTER DOT COUNTER NVc | VERTICAL CHARACTER SIZE CONTROL |
|---|---|---|
| 252–265 | 18 | SINGLE READING |
| 266–279 | 19 | |
| 280–293 | 20 | |
| 294–307 | 21 | |
| 308–321 | 22 | |
| 322–335 | 23 | |
| 336–349 | 24 | |
| 350–363 | 25 | |
| 364–377 | 26 | |
| 378–391 | 27 | |
| 392–405 | 28 | |
| 406–419 | 29 | |
| 420–433 | 30 | |
| 434–447 | 31 | |
| 448–461 | 32 | |
| 462–477 | 33 | |
| 478–489 | 43 | |
| 490–503 | 35 | |
| 504–531 | 18 | DOUBLE READING |
| 532–559 | 19 | |
| 560–587 | 20 | |
| 588–615 | 21 | |
| 616–643 | 22 | |
| 644–671 | 23 | |
| 672–699 | 24 | |
| 700–727 | 25 | |
| 728–755 | 26 | |
| 756–783 | 27 | |
| 784–811 | 28 | |
| 812–839 | 29 | |
| 840–867 | 30 | |
| 868–895 | 31 | |
| 896–923 | 32 | |
| 924–951 | 33 | |
| 952–979 | 34 | |
| 980–1007 | 35 | |

TABLE 2

| SCANNING LINES OF INPUT SIGNAL SV | COUNT SET VALUE OF VERTICAL CHARACTER DOT COUNTER NVc | (CHARAC- VERTICAL CHAR- ACTER SIZE CONTROL | TYPE OF FONT TER) FORMING VERTICAL DOT NUMBER) |
|---|---|---|---|
| 252–265 | 18 | SINGLE READING | font 1 (11) |
| 266–279 | 19 | | |
| 280–293 | 20 | SINGLE READING | font 2 (13) |
| 294–307 | 21 | | |
| 308–321 | 22 | | |

TABLE 2-continued

| SCANNING LINES OF INPUT SIGNAL SV | COUNT SET VALUE OF VERTICAL CHARACTER DOT COUNTER NVc | (CHARAC- VERTICAL CHAR- ACTER SIZE CONTROL | TYPE OF FONT (CHARAC- TER) FORMING VERTICAL DOT NUMBER) |
|---|---|---|---|
| 322–335 | 23 | | |
| 336–349 | 24 | SINGLE | font 3 |
| 350–363 | 25 | READING | (16) |
| 364–377 | 26 | | |
| 378–391 | 27 | | |
| 392–405 | 28 | | |
| 406–419 | 29 | | |
| 420–433 | 30 | SINGLE | font 4 |
| 434–447 | 31 | READING | (20) |
| 448–461 | 32 | | |
| 462–477 | 33 | | |
| 478–489 | 34 | | |
| 490–503 | 35 | | |
| 504–531 | 18 | DOUBLE | font 1 |
| 532–559 | 19 | READING | (11) |
| 560–587 | 20 | DOUBLE | font 2 |
| 588–615 | 21 | READING | (13) |
| 616–643 | 22 | | |
| 644–671 | 23 | | |
| 672–699 | 24 | DOUBLE | font 3 |
| 700–727 | 25 | READING | (16) |
| 728–755 | 26 | | |
| 756–783 | 27 | | |
| 784–811 | 28 | | |
| 812–839 | 29 | | |
| 840–867 | 30 | DOUBLE | font 4 |
| 868–895 | 31 | READING | (20) |
| 896–923 | 32 | | |
| 924–951 | 33 | | |
| 952–979 | 34 | | |
| 980–1007 | 35 | | |

TABLE 3

| SCANNING LINES OF INPUT SIGNAL SV | COUNT SET VALUE OF VERTICAL CHARACTER DOT COUNTER NVc | TYPE OF FONT (CHARAC- TER FORM- ING VERTICAL DOT NUMBER) |
|---|---|---|
| 252–265 | 18 | font 1 |
| 266–279 | 19 | (11) |
| 280–293 | 20 | font 2 |
| 294–307 | 21 | (13) |
| 308–321 | 22 | |
| 322–335 | 23 | |
| 336–349 | 24 | font 3 |
| 350–363 | 25 | (16) |
| 364–377 | 26 | |
| 378–391 | 27 | |
| 392–405 | 28 | |
| 406–419 | 29 | |
| 420–433 | 30 | font 4 |
| 434–447 | 31 | (20) |
| 448–461 | 32 | |
| 462–477 | 33 | |
| 478–489 | 34 | |
| 490–503 | 35 | |
| 504–517 | 36 | font 5 |
| 518–531 | 37 | (22) |
| 532–545 | 38 | |
| 546–559 | 39 | |
| 560–573 | 40 | font 6 |
| 574–587 | 41 | (26) |
| 588–601 | 42 | |
| 602–615 | 43 | |
| 616–629 | 44 | |
| 630–643 | 45 | |
| 644–657 | 46 | |
| 658–671 | 47 | |
| 672–685 | 48 | font 7 |
| 686–699 | 49 | (32) |
| 700–713 | 50 | |
| 714–727 | 51 | |
| 728–741 | 52 | |
| 742–755 | 53 | |
| 756–769 | 54 | |
| 770–783 | 55 | |
| 784–797 | 56 | |
| 798–811 | 57 | |
| 812–825 | 58 | |
| 826–839 | 59 | |
| 840–853 | 60 | font 8 |
| 854–867 | 61 | (40) |
| 868–881 | 62 | |
| 882–895 | 63 | |
| 896–909 | 64 | |
| 910–923 | 65 | |
| 924–937 | 66 | |
| 938–951 | 67 | |
| 952–965 | 68 | |
| 966–979 | 69 | |
| 980–993 | 70 | |
| 994–1007 | 71 | |

TABLE 4

| | REVERSE ON/OFF | R ON/OFF | G ON/OFF | B ON/OFF |
|---|---|---|---|---|
| a | 0 | 1 | 1 | 1 |
| b | 0 | 1 | 0 | 0 |
| c | 0 | 0 | 1 | 0 |
| d | 1 | 0 | 0 | 1 |
| e | 1 | 1 | 0 | 1 |

What is claimed is:

1. An on-screen display apparatus, comprising:
   a memory means for storing font data including face data and a blank portion for each character in the font data;
   a counter for counting synchronizing signals corresponding to a number of scanning lines in a character to be displayed;
   a detection means for detecting a number of scanning lines in one screen from an input signal; and
   a vertical dot count control means for determining a vertical dot number of the character to be displayed from said memory means in accordance with the number of scanning lines detected by said detection means, said vertical dot count control means outputting to said counter a signal which controls the number of scanning lines to be counted by said counter,
   wherein the character having the vertical dot number of said blank portion adjusted in accordance with the number of scanning lines counted by said counter are outputted from said memory means.

2. The on-screen display apparatus according to claim 1, further comprising a vertical character size control means for instructing said counter to count up by an increment which is equal to a predetermined number of lines in accordance with the number of scanning lines detected by said detection means so as to control a vertical size of the face data.

3. The on-screen display apparatus according to claim 1, further comprising a font data selection means for selecting the font data from said memory means in accordance with the number of scanning lines detected by said detection means, said memory means storing the font data about various kinds of characters wherein each of the font data differs in a number of vertical dots forming the face data.

4. The on-screen display apparatus according to claim 1, further comprising a font data selection means for selecting the font data from said memory means in accordance with the number of scanning lines detected by said detection means, said vertical dot count control means instructing said counter to count up by an increment which is equal to a predetermined number of lines in accordance with the number of scanning lines detected by said detections means so as to control a vertical size of the face data, and said memory means storing the font data about various kinds of characters wherein each of the font data differs in a number of vertical dots forming the face data.

5. The on-screen display apparatus according to claim 2, further comprising a font data selection means for selecting the font data from said memory means in accordance with the number of scanning lines detected by said detection means, said memory means storing the font data about various kinds of characters wherein each of the font data differs in the number of vertical dots.

6. An on-screen display method, comprising the steps of:

detecting a number of scanning lines in an input signal;

determining a vertical dot number of a character to be displayed in accordance with the detected number of scanning lines;

counting synchronizing signal corresponding to a number of scanning lines of the character to be displayed in accordance with the determined vertical dot number; and outputting font data selected from a memory which stores a plurality of the font data including face data and a blank portion of characters after adjusting a vertical dot number of said blank portion in accordance with the number of scanning lines to be counted by a counter.

7. The on-screen display method according to claim 6, further comprising the step of instructing said counter to count up by an increment which is equal to a predetermined number of lines in accordance with the detected number of scanning lines so as to control a vertical size of the face data.

8. The on-screen display method according to claim 6, further comprising the steps of storing the font data about various kinds of characters wherein each of the font data differs in a number of vertical dots forming the face data;

outputting the stores font data in accordance with the detected number of the scanning lines in the input signal.

9. The on-screen display method according to claim 6, further comprising the steps of:

instructing said counter to count up by an increment which is equal to a predetermined number in accordance with the number of the scanning lines detected by said detection step, so as to control a vertical size of the face data;

storing the font data about various kinds of characters wherein each of the font data differs in a number of vertical dots forming the face data;

outputting the stored font data in accordance with the detected number of the scanning lines in the input signal.

* * * * *